US008553289B2

(12) United States Patent
Ramesh et al.

(10) Patent No.: US 8,553,289 B2
(45) Date of Patent: Oct. 8, 2013

(54) METHOD AND APPARATUS FOR COMPENSATION OF ARBITRARY BANDING SOURCES USING INLINE SENSING AND CONTROL

(75) Inventors: Palghat S. Ramesh, Pittsford, NY (US); Peter Paul, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 318 days.

(21) Appl. No.: 13/074,267

(22) Filed: Mar. 29, 2011

(65) Prior Publication Data

US 2012/0250037 A1 Oct. 4, 2012

(51) Int. Cl.
*G06K 15/00* (2006.01)

(52) U.S. Cl.
USPC ......... 358/3.26; 358/1.4; 358/3.27; 358/1.12; 347/19; 399/9

(58) Field of Classification Search
USPC .................................... 358/1.4, 1.9; 382/254
See application file for complete search history.

(56) References Cited

U.S. PATENT DOCUMENTS

| | | | | |
|---|---|---|---|---|
| 5,519,514 | A | 5/1996 | TeWinkle | |
| 5,550,653 | A | 8/1996 | TeWinkle et al. | |
| 5,680,541 | A | 10/1997 | Kurosu et al. | |
| 5,732,306 | A * | 3/1998 | Wilczak, Jr. | 399/9 |
| 6,342,963 | B1 | 1/2002 | Yoshino | |
| 6,462,821 | B1 | 10/2002 | Borton et al. | |
| 6,567,170 | B2 | 5/2003 | Tandon et al. | |
| 6,621,576 | B2 | 9/2003 | Tandon et al. | |
| 6,975,949 | B2 | 12/2005 | Mestha et al. | |
| 7,024,152 | B2 | 4/2006 | Lofthus et al. | |
| 7,058,325 | B2 | 6/2006 | Hamby et al. | |
| 7,120,369 | B2 | 10/2006 | Hamby et al. | |
| 7,136,616 | B2 | 11/2006 | Mandel et al. | |
| 7,177,585 | B2 | 2/2007 | Matsuzaka et al. | |
| 2002/0171697 | A1 * | 11/2002 | Gargir et al. | 347/14 |
| 2003/0142985 | A1 * | 7/2003 | Sampath et al. | 399/9 |
| 2007/0052991 | A1 * | 3/2007 | Goodman et al. | 358/1.12 |
| 2007/0139509 | A1 | 6/2007 | Mizes et al. | |
| 2007/0236747 | A1 | 10/2007 | Paul | |
| 2009/0002724 | A1 | 1/2009 | Paul et al. | |
| 2009/0046325 | A1 * | 2/2009 | Paul et al. | 358/3.26 |
| 2011/0058184 | A1 | 3/2011 | Ramesh et al. | |
| 2011/0058186 | A1 | 3/2011 | Ramesh et al. | |
| 2011/0058226 | A1 | 3/2011 | Ramesh et al. | |

* cited by examiner

*Primary Examiner* — Marivelisse Santiago Cordero
*Assistant Examiner* — Daryl Jackson
(74) *Attorney, Agent, or Firm* — Fay Sharpe LLP

(57) ABSTRACT

A method for compensation of banding in a marking platform includes: initiating a signature learning mode; establishing a timing reference after marking modules have achieved constant velocity; marking a test pattern over multiple intervals of a lowest fundamental frequency among marking modules; obtaining image data for the test pattern from a sensor; and processing the image data in relation to the timing reference to form banding profiles for multiple banding sources. Alternatively, the method may include: initiating a cycle up stage in a phase learning mode; establishing a timing reference after marking modules have achieved constant velocity; marking a test pattern over multiple intervals of a lowest fundamental frequency among marking modules; obtaining banding image data for the test pattern from a sensor; and processing the image data with banding signatures in relation to the timing reference to form phase estimates for each banding signature. Additional embodiments are also provided.

30 Claims, 19 Drawing Sheets

| FREQ(Hz) 220mm/s | SOURCE |
|---|---|
| 1.22 | BLACK PR (USING 188, 1.17 Hz IF USING 60 mm DIA) |
| 1.72 | IBT, DRIVE (59K32500) |
| 1.75 | CMY PR |
| 2.00 | HEAT ROLL |
| 2.24 | FUSER ROLL |
| 2.50 | 2ND BTR |
| 3.50 | 2ND BUR |
| 3.79 | 1ST BTR FOR EACH COLOR |
| 3.89 | IDLE ROLL(59K32510) |
| 5.00 | BCR (K DRUM) |
| 6.11 | DEV ROLLER (MAG ROLL) |

*FIG. 8*

METHOD AND APPARATUS FOR COMPENSATION OF ARBITRARY BANDING SOURCES USING INLINE SENSING AND CONTROL

BACKGROUND

The present exemplary embodiment relates generally to compensation of banding from multiple sources in a marking platform. It finds particular application in conjunction with a multicolor marking platform with xerographic marking engines. However, it is to be appreciated that the exemplary embodiments described herein are also amenable to various other types of marking engines and other types of marking platforms.

Banding is a type of image quality defect that occurs on printed pages. It manifests itself as a variation in density with respect to the process direction. Most banding is periodic. Periodic density variations may be characterized by frequency, amplitude, and phase in relation to a fundamental frequency, as well as harmonics. Various sources of banding exist in a marking (or print) engine. The frequencies of these sources are typically known based on the mechanical design of the engine. The frequencies, for example, may be obtained from the manufacturer, third parties, or measured. To compensate for the banding effects, the amplitude and phase also need to be obtained from measurements.

Recent work has identified techniques for identifying banding sources using measurements of test patterns on paper, using a multipage coherent fast Fourier transform (FFT) technique to identify the banding sources. Further, a cubic spline interpolation technique has been used to fit banding profiles to single known sources, such as photoreceptor (PR) 1×. The cubic spline interpolation technique has also been applied to derive an optimal exposure correction for single known sources across the tone reproduction curve (TRC) for banding compensation. However, these techniques require interrupting the print job to print several test images and additional offline processing to determine the correction. Further, these techniques use once around (1×) sensors on the components that may cause banding.

INCORPORATION BY REFERENCE

The following documents are fully incorporated herein by reference: 1) U.S. Pat. App. Publication No. 2011/0058186 to Ramesh et al., filed Sep. 8, 2009, Least Squares Based Coherent Multipage Analysis of Printer Banding for Diagnostics and Compensation; 2) U.S. Pat. App. Publication No. 2011/0058226 to Ramesh et al., filed Sep. 8, 2009, Banding Profile Estimation using Spline Interpolation; 3) U.S. Pat. App. Publication No. 2011/0058184 to Ramesh et al., filed Sep. 8, 2009, Least Squares Based Exposure Modulation for Banding Compensation; 4) U.S. Pat. App. Publication No. 2007/0052991 to Goodman et al., filed Sep. 8, 2005, Methods and Systems for Determining Banding Compensation Parameters in Printing Systems; 5) U.S. Pat. App. Publication No. 2009/0002724 to Paul et al., filed Jun. 27, 2007, Banding Profile Estimator using Multiple Sampling Intervals; 6) U.S. Pat. App. Publication No. 2007/0139509 to Mizes et al., filed Dec. 21, 2005, Compensation of MPA Polygon Once Around with Exposure Modulation; 7) U.S. Pat. App. Publication No. 2007/0236747 to Paul et al., filed Apr. 6, 2006, Systems and Methods to Measure Banding Print Defects; 8) U.S. Pat. No. 7,120,369 to Hamby et al., filed May 25, 2004, Method and Apparatus for Correcting Non-uniform Banding and Residual Toner Density using Feedback Control; 9) U.S. Pat. No. 7,058,325 to Hamby et al., filed May 25, 2004, Systems and Methods for Correcting Banding Defects using Feedback Control and/or Feedforward Control; 10) U.S. Pat. No. 5,519,514 to TeWinkle; 10) U.S. Pat. No. 5,519,514 to TeWinkle; 11) U.S. Pat. No. 5,550,653 to TeWinkle et al.; 12) U.S. Pat. No. 5,680,541 to Kurosu et al.; 13) U.S. Pat. No. 6,621,576 to Tandon et al.; 14) U.S. Pat. No. 6,342,963 to Yoshino; 15) U.S. Pat. No. 6,462,821 to Borton et al.; 16) U.S. Pat. No. 6,567,170 to Tandon et al.; 17) U.S. Pat. No. 6,975,949 to Mestha et al.; 18) U.S. Pat. No. 7,024,152 to Lofthus et al.; 19) U.S. Pat. No. 7,136,616 to Mandel et al.; and 20) U.S. Pat. No. 7,177,585 to Matsuzaka et al.

BRIEF DESCRIPTION

In one aspect, a method for compensation of banding in a marking platform is provided. In one embodiment, the method includes: a) initiating a signature learning mode to determine banding characteristics of a marking platform, the marking platform comprising a plurality of marking modules at least a portion of which are select marking modules, each select marking module being a potential banding source such that a fundamental frequency for banding characteristics associated with each select marking module is known; b) establishing a timing reference after the plurality of marking modules have achieved a relatively constant velocity in conjunction with the signature learning mode; c) marking a banding test pattern on an image receiving member over at least multiple intervals of a lowest fundamental frequency among the select marking modules; d) obtaining banding image data for the banding test pattern from a test pattern image sensor in conjunction with the marking in c); and e) processing the banding image data in relation to the timing reference to form a banding profile for each of one or more banding sources within the marking platform, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the timing reference for the corresponding banding source.

In another embodiment, a method for compensation of banding in a marking platform includes: a) initiating a cycle up stage in a phase learning mode to determine phase banding characteristics for each of one or more dominant banding signatures in conjunction with processing a marking job on a marking platform, the marking platform comprising a plurality of marking modules at least a portion of which are select marking modules, each select marking module being a potential banding source such that a fundamental frequency for banding characteristics associated with each select marking module is known, each dominant banding signature reflecting amplitude and frequency banding characteristics over at least one sample period of the corresponding fundamental frequency for corresponding dominant banding sources; b) establishing a timing reference after the plurality of marking modules have achieved a relatively constant velocity in conjunction with the cycle up stage; c) marking a banding test pattern on an image receiving member over at least multiple intervals of a lowest fundamental frequency among the select marking modules; d) obtaining banding image data for the banding test pattern from a test pattern image sensor in conjunction with the marking in c); and e) processing the banding image data obtained in d) with each of the one or more dominant banding signatures in relation to the timing reference to form a corresponding banding phase estimate for each of the one or more dominant banding signatures in conjunction with processing the marking job.

In yet another embodiment, a method for compensation of banding in a marking platform includes: a) initiating a banding signature validation mode to test if current dominant banding signatures for a marking platform need to be replaced with fresh dominant banding signatures, the marking platform comprising a plurality of marking modules at least a portion of which are select marking modules, each select marking module being a potential banding source such that a fundamental frequency for banding characteristics associated with each select marking module is known, each current dominant banding signature reflecting amplitude and frequency banding characteristics over at least one sample period of the corresponding fundamental frequency for corresponding dominant banding sources; b) periodically processing each of one or more current dominant banding signatures with corresponding banding phase estimates in relation to a timing reference to determine a current banding compensation value for the marking platform, each banding phase estimate formed from banding image data associated with a banding test pattern, each banding phase estimate processed using the corresponding current dominant banding signature in relation to the timing reference, the timing reference established after the plurality of marking modules achieve a relatively constant velocity in conjunction with the banding signature validation mode, wherein the timing reference is used to combine the dominant banding signatures in time relation to determine the current banding compensation value; c) correlating the current banding compensation value with the banding image data in relation to the timing reference to determine a corresponding current effectiveness metric; and d) determining at least one current effectiveness metric determined in c) exceeds a corresponding effectiveness threshold.

In still another embodiment, a method for compensation of banding in a marking platform includes: a) processing banding image data in relation to a timing reference to form a banding profile for each of one or more banding sources within a marking platform, the marking platform comprising a plurality of marking modules at least a portion of which are select marking modules, each select marking module being a potential banding source such that a fundamental frequency for banding characteristics associated with each select marking module is known, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the timing reference for the corresponding banding source in relation to a banding test pattern; b) determining at least one amplitude value in one or more banding profiles exceed a corresponding amplitude threshold to identify dominant banding profiles and corresponding dominant banding sources; and c) processing each dominant banding profile to form a dominant banding signature for the corresponding dominant banding source, each dominant banding signature reflecting the phase relation of amplitude and frequency banding characteristics over at least one sample period of the corresponding fundamental frequency for the corresponding dominant banding source.

BRIEF DESCRIPTION OF THE DRAWINGS

FIG. 8 is a table showing potential banding sources in an exemplary marking platform;

DETAILED DESCRIPTION

Figure 1:
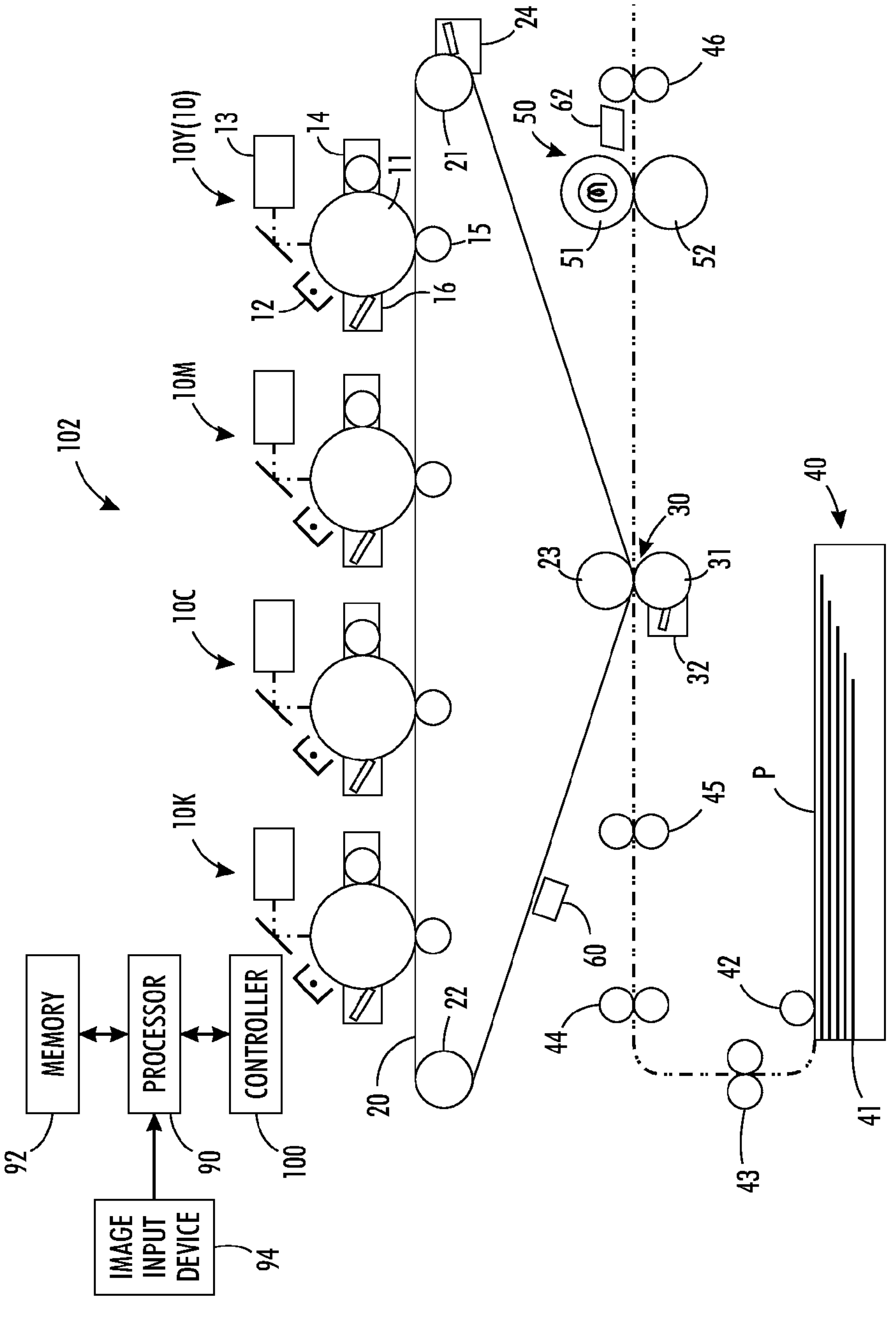
FIG. 1 is a block diagram of an exemplary embodiment of a marking platform.

This disclosure describes various embodiments of methods and systems for compensation of banding from multiple arbitrary sources in a marking platform. The banding sources and associated banding profiles are learned during cycle-up using measurements from an inline density sensor, such as an area density coverage (ADC) sensor, an enhanced tone area coverage (ETAC) sensor, a full width array (FWA) sensor, or an electrostatic volt (ESV) sensor. The signatures are used to derive a correction which is applied to an actuator associated with a marking module (e.g., exposure). During subsequent cycle-ups, a reduced set of test patterns are printed to learn the phase relationship of the banding sources with the image, which is used to apply the correction. Also, during subsequent cycle ups and/or in the inter-document zones (IDZs), the validity of the banding signatures may be determined. If any banding signature is no longer valid, a more complete set of test images may be printed to relearn the banding signatures and replace the banding signature. Since the test images are printed during cycle up or in IDZs, no interruption of the customer job is necessary to apply the banding compensation. Also, inline sensing and control allows the system to continually monitor and compensate for varying banding signatures. Finally, since the phase relationships of the sources to the image are learned at cycle-up, 1× sensors on potential banding sources and other related hardware are not required.

The "banding profile," "banding signature," "banding compensation profile," "banding compensation value," and "banding correction value" are terms and phrases used to describe the various embodiments of the methods and systems for compensation of arbitrary banding sources. As used herein, "banding profile" can include a raw sensed density variation as a function of process direction position over multiple pages. As used herein, "banding signature" can include unraveled profiles reduced to the average density variation in the process direction for one period, unraveled profiles reduced to the average density variation in the process direction for one period. Typically, banding signatures are determined for each dominant banding source. The phase of the banding signature is relative to the timing reference established for the banding signature learning mode. Banding signature is $b_{0k}(\tau)$, where $0 \leq \tau \leq T_{k+}$, where $T_k = 1/f_k$ and $f_k$ is the fundamental frequency of the banding source k. As used herein, "banding compensation profile" can include banding signatures adjusted for the current time reference, such that $b_k(t) = b_{0k}(\mathrm{Mod}(t + \phi_k, T_k))$, where $\phi_k$ is the phase based on the current time reference. As used herein, "banding compensation value" can include a sum of instantaneous banding signatures at appropriate respective phases based on a current elapsed time. As used herein, "banding correction value" can include a banding compensation value scaled by a sensitivity constant to adjust the banding compensation value to correspond to a drive signal of an actuator unit for a particular marking module capable of compensating for banding.

Color stability in tandem and image-on-image (IOI) engines has been investigated to study correlation between mass variation on an image receiving member (e.g., intermediate belt for tandem and PR for IOI) and color variations on paper. In intermediate belt transfer (IBT) tandem engines (e.g., Xerox Phase 7750, Xerox DC250, Xerox DC8000), excellent correlation was found between toner mass variations measured on the intermediate belt with an ETAC or ADC and process direction color variations on paper. Other sensors (e.g., ESV on the PR drum) can also be used for sensing banding defects due to certain banding sources. Banding is often a key component of the color variations. Some of the most common sources of banding such as PR 1×, developer roller 1×, bias charge roller (BCR), $1^{st}$ bias transfer roller (BTR), and PR drives can potentially be detected on the intermediate belt and thus are amenable to the concepts discussed herein.

Turning now to the drawings, FIG. 1 illustrates a schematic perspective view of an exemplary embodiment of a marking platform 102 in accordance with an embodiment. The marking platform 102 includes plural (in this exemplary embodiment, four) marking engines 10, an intermediate transfer belt 20, a secondary transfer device 30, a sheet carrying device 40, and a fixing device 50. The marking platform 102 further includes a controller 100, a processor 90, a memory 92, and an image input device 94. The controller 100 may be provided to control the various elements and sequence of operations of the marking platform 102. In some implementations, the controller 100 and/or processor 90 may be dedicated hardware like ASICs or FPGAs, software (firmware), or a combination of dedicated hardware and software. For the different applications of the embodiments disclosed herein, the programming and/or configuration may vary. The processor 90 may include one processor or one or more sub-processors. The exemplary marking platform 102 shows a xerographic color image printing system with an "intermediate-belt-transfer" in which successive primary-color (e.g., C, M, Y, K) images are accumulated on image bearing surfaces 11 of a PR drum. Each image bearing surface 11 in turn transfers the images to an intermediate transfer member 30. However, it should be appreciated that any image printing machine, such as monochrome machines using any technology, machines that print on photosensitive substrates, xerographic machines with multiple PRs, IOI xerographic color image printing systems (e.g., see U.S. Pat. No. 7,177,585), tightly integrated parallel printing (TIPP) systems (e.g., see U.S. Pat. Nos. 7,024,152 and 7,136,616), or ink-jet-based machines may utilize the exemplary embodiments provided in this disclosure as well.

The marking engine 10 includes a yellow unit 10Y for forming a yellow image, a magenta unit 10M for forming a magenta image, a cyan unit 10C for forming a cyan image, and a black unit 10K for forming a black image. The yellow unit 10Y, the magenta unit 10M, the cyan unit 10C and the black unit 10K form toner images of respective color separations as images, for example, via electrophotography techniques.

The marking engines 10Y, 10M, 10C and 10K, which may serve as an image forming section, have the same configuration except different colors of toner are used. Accordingly, for example, the yellow unit 10Y will be described below. The yellow unit 10Y includes an image bearing surface 11, a charging device 12, an exposure device 13, a developing device 14, a primary transfer device 15 and a drum cleaner 16. The charging device 12 charges the image bearing surface 11 to a predetermined potential. The exposure device 13 exposes the charged image bearing surface 11 to form an electrostatic latent image. The developing device 14 receives each color component toner (in the yellow unit 10Y, yellow toner) and develops the electrostatic latent image formed on the image bearing surface 11 with the toner. The primary transfer device 15, for example, includes a roll member (e.g., primary transfer roll) which is in pressure-contact with the image bearing surface 11 via the intermediate transfer belt 20 with the intermediate transfer belt interposed between the primary transfer device 15 (roll member) and the image bearing surface 11. The primary transfer device 15 applies a predetermined transfer bias between the image bearing surface 11 and the primary transfer roll to primarily transfer the toner image formed on the image bearing surface 11 onto the intermediate transfer belt 20. The drum cleaner 16 removes remaining toner on the image bearing surface 11 after the primary transfer.

The intermediate transfer belt 20, which serves as a recording material, may be disposed rotatably and wound on a driving roll 21, a driven roll 22 and a backup roll 23. Among them, the driving roll 21 may be rotatable, and may stretch the intermediate transfer belt 20 and transmit a driving force to the intermediate transfer belt 20. The driven roll 22 may be rotatable, and may stretch the intermediate transfer belt 20 and merely rotates as the intermediate transfer belt 20 rotates. The backup roll 23 may be rotatable, and may stretch the intermediate transfer belt 20 and may serve as a constituent component of the secondary transfer device 30 as described below. A belt cleaner 24 for removing the remaining toner on the intermediate transfer belt 20 after secondary transfer may be provided so as to face a part of the intermediate transfer belt 20 wound on the driving roll 21.

The secondary transfer device 30 includes a secondary transfer roll 31 that is rotatable and that is in pressure-contact with a surface, on a side where the toner image is carried, of the intermediate transfer belt 20. The secondary transfer device 30 also includes the backup roll 23 disposed on the rear surface of the intermediate transfer belt 20 to form an opposite electrode for the secondary transfer roll 31. A predetermined secondary transfer bias is applied between the secondary transfer roll 31 and the backup roll 23 such that the toner image on the intermediate transfer belt 20 is secondarily transferred onto a sheet of target media P (e.g., paper). For example, a roll cleaner 32 for removing the toner transferred from the intermediate transfer belt 20 to the secondary transfer roll 31 is mounted on the secondary transfer roll 31.

Marking platform 102 may include sensors 60 and 62 individually or in combination. Sensors 60 and 62 are configured to provide image data (e.g., reflectance of the image in the process and/or cross-process direction) to the processor 90. The sensor 60 may be configured to sense images created on the intermediate transfer belt 20 and/or to scan test patterns. Sensor 62 may be configured to sense images created in output prints on target media P, including paper prints. It should be appreciated that any number of sensors may be provided, and may be placed anywhere in the marking platform 102 as needed, not just in the locations illustrated.

It should be appreciated that sensors 60 and 62 may be ADC sensors. See, e.g., U.S. Pat. No. 5,680,541 for example of an ADC sensor. Alternatively, sensors 60 and 62 may be FWAs or ETAC sensors. See, e.g., U.S. Pat. Nos. 6,975,949 and 6,462,821, for examples of a FWA and an ETAC sensor, respectively. Sensors 60 and 62 may alternatively include a spectrophotometer, color sensors, or color sensing systems. See, e.g., U.S. Pat. Nos. 6,567,170; 6,621,576; 5,519,514; and 5,550,653 for examples of these types of sensors. It should be appreciated that other linear array sensors may also be used, such as contact image sensors, CMOS array sensors or CCD array sensors.

Image input device 94 (e.g., an input scanner) may capture an image from an original document, a computer, a network, or any similar or equivalent image input terminal. In this exemplary embodiment, image input device 94 may send image data to processor 90.

Processor 90 is configured to receive reflectance of the image, or image data, in the process and/or cross-process direction sensed by sensors 60 and/or 62. The processor 90 is configured to generate reflectance profile data and send the data to the controller 100. Processor 90 may also be configured to augment image data with known timing data or analyze the image data to determine timing data that is synchronous with potential banding sources. Data received and generated by processor 90 may be stored on memory 92.

The sheet carrying device 40 includes a sheet accommodating section 41, a pickup roll 42, a separation roll 43, a preregistration roll 44, a registration roll 45 and an ejection roll 46. The sheet accommodating section 41 has an opening at its upper part, has a rectangular shape and accommodates the sheet P therein. The pickup roll 42 is provided above the sheet accommodating section 41 to continuously feed an uppermost target media P of the stack of target media P accommodated in the sheet accommodating section 41. The separation roll 43 separates and carries the target media P, which are continuously fed by the pickup roll 42, one by one. The preregistration roll 44 carries the target media P carried through the separation roll 43 downstream and forms a loop together with the registration roll 45. The registration roll 45 pauses the carrying of the target media P and resumes the rotation at a predetermined timing so as to feed the target media P while control the registration with respect to the secondary transfer device 30. The ejection roll 46 carries the target media P, on which the toner image is transferred by passing through the secondary transfer device 30 and is fused by passing through the fixing device 50, toward a not-shown ejection section.

The fixing device 50 includes a heating roll 51 which has a heating source therein and which is rotatable. The fixing device 50 also includes a pressing roll 52 which is in contact with the heating roll 51 and rotates as the heating roll 51 rotates.

Figure 2:
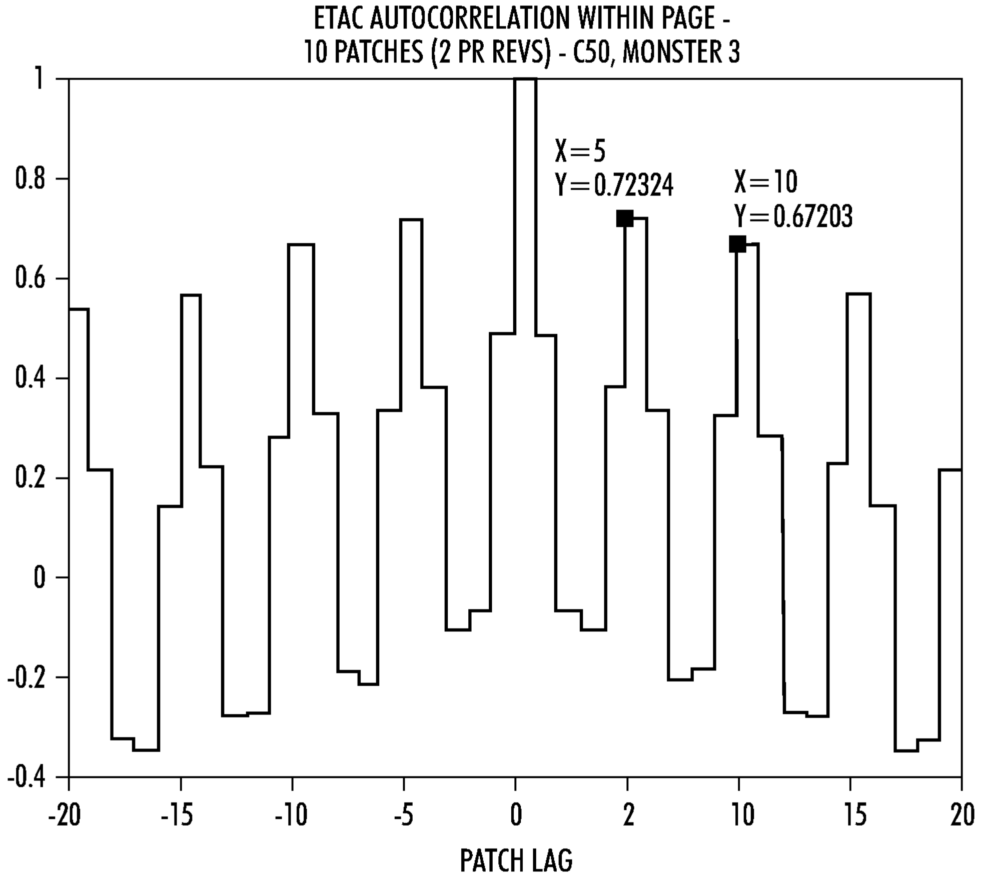
FIG. 2 is a graph showing autocorrelation of process direction variation in a marking platform using an ETAC sensor.
Figure 3:
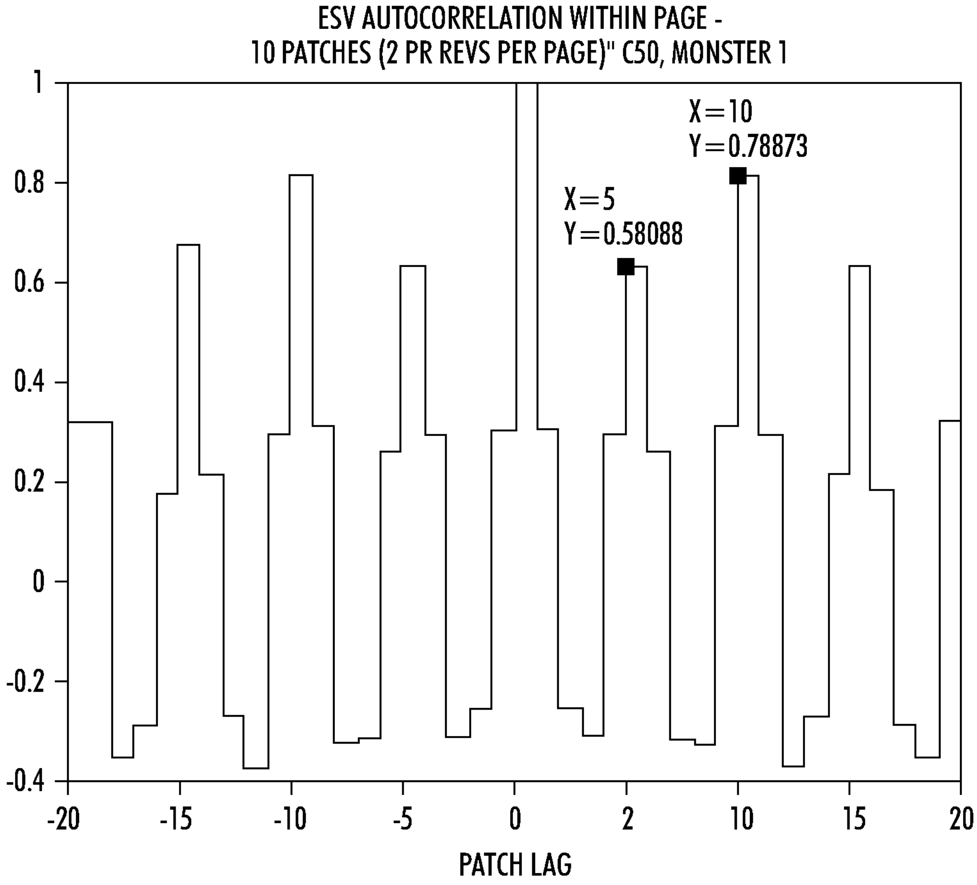
FIG. 3 is a graph showing autocorrelation of process direction variation in a marking platform using an ESV sensor.
Figure 4:
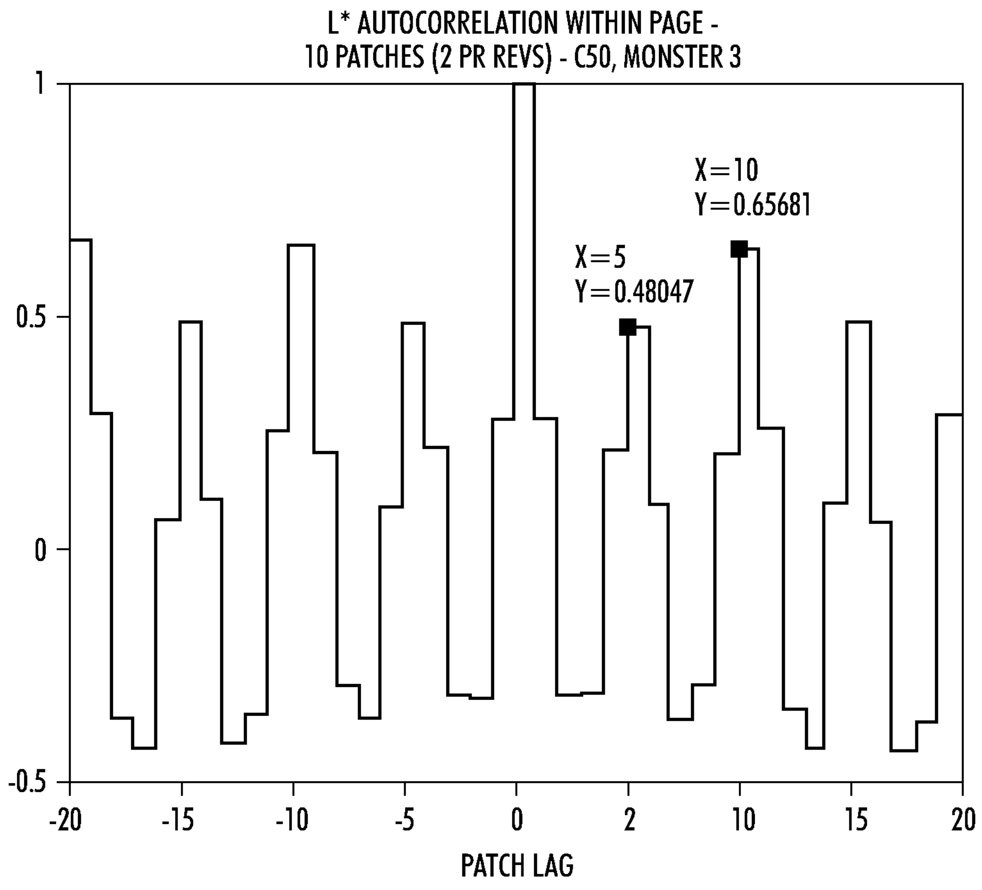
FIG. 4 is a graph showing L* autocorrelation of process direction variation in a marking platform.

FIGS. 2-4 show an auto correlation of process direction variations in a marking platform detected using an ETAC sensor (FIG. 2), an ESV sensor (FIG. 3), and L* (FIG. 4). The data for the process direction variations was collected using a Xerox Phaser 7750 marking engine printing full page 50% Cyan test patterns. Autocorrelation peaks every 5 patches are due to PR 1× and can be clearly seen across all the data. This shows that a density sensor or an ESV can be used for learning the banding signatures.

Figure 5:
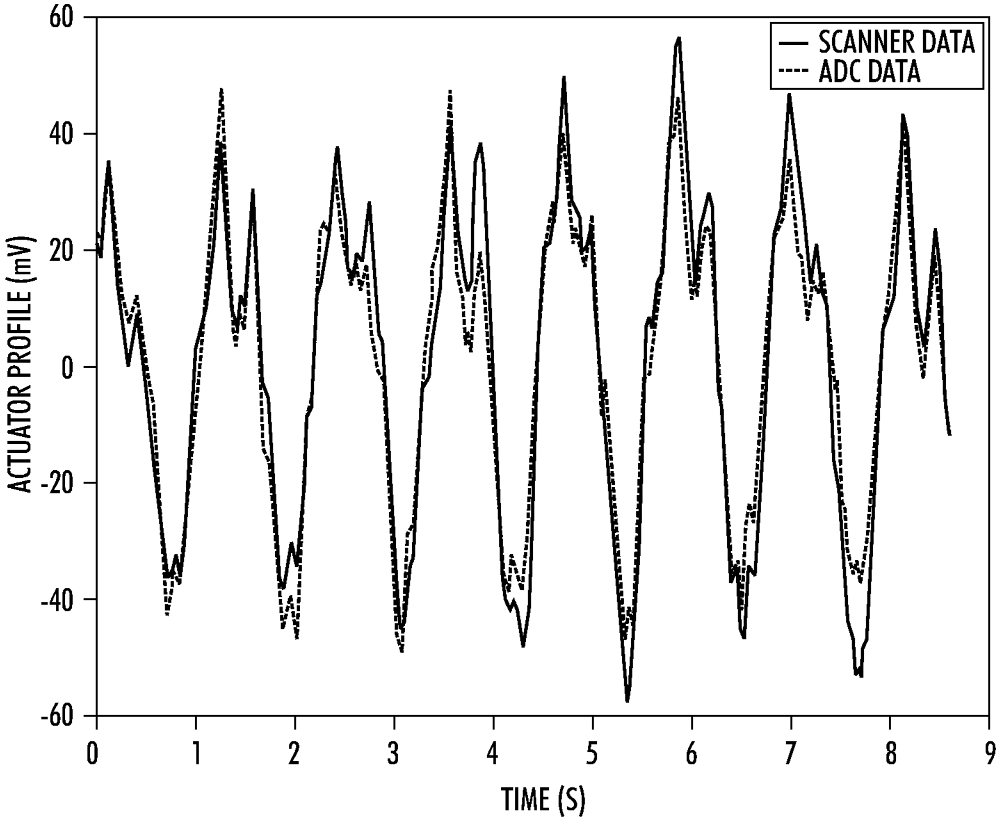
FIG. 5 is a graph showing banding profiles generated from data obtained from an ADC sensor and data obtained from a scanner. The profiles are normalized to a slope for an exposure actuator.

Sensing of banding using inline sensors, such as an area density coverage (ADC) sensor, an enhanced tone area coverage (ETAC) sensor, a full width array (FWA) sensor, or an electrostatic voltmeter (ESV), was demonstrated. For example, FIG. 5 shows banding profiles for a full page 50% Cyan image on a Xerox DC250 generated using ADC sensor data from test patterns imaged on the intermediate belt and scanner data from test pattern prints on target media. The data was normalized by converting it to exposure actuator units. The dominant banding source is the PR drum and the banding profiles generated with the ADC and scanner are consistent. Thus, an ADC sensor can be used to derive banding correction for PR1× banding. Moreover, banding correction signals derived from the ADC are very similar to those derived from offline scanner based measurements. The profiles in FIG. 5 are normalized to the slope of the exposure actuator after subtracting the mean. The residual noise signals show that performing a bare belt calibration for the ADC may improve performance significantly.

Figure 6:
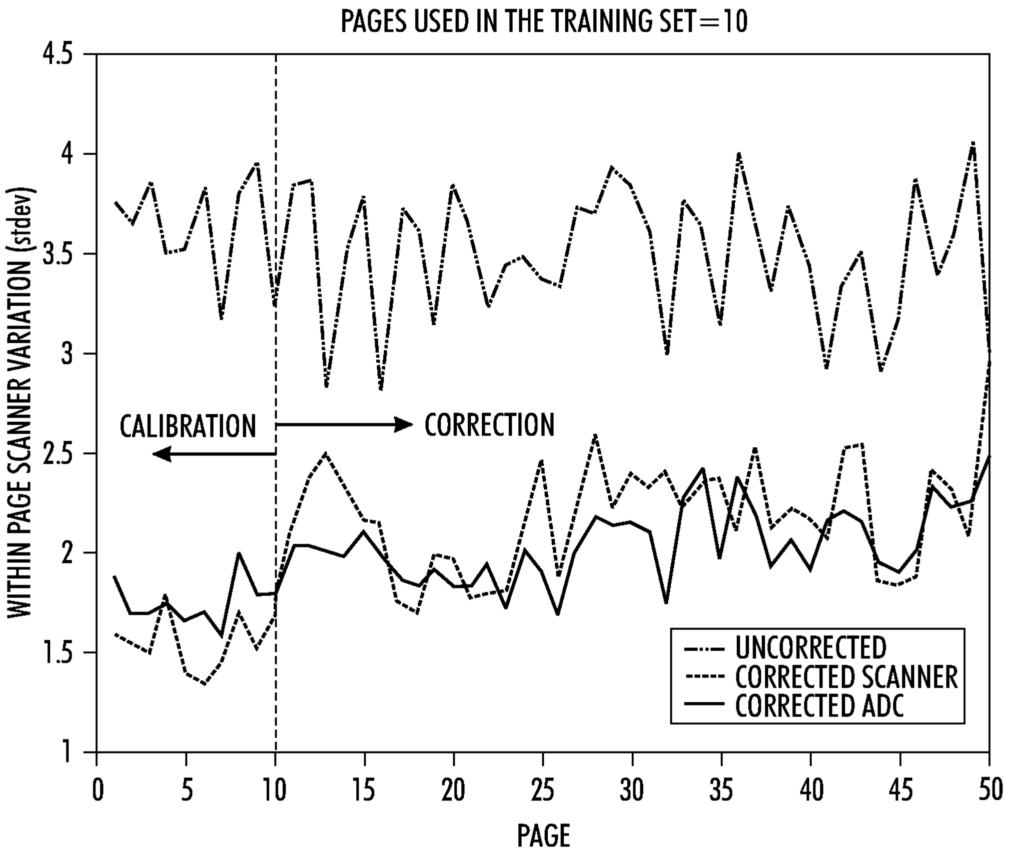
FIG. 6 is a graph showing the effect of banding correction in a marking platform in relation to a 50% cyan halftone test pattern.

FIG. 6 shows "within page" variation expected after banding correction using inline or offline sensing of the banding signature. The black curve is the uncorrected "within page" variation during a 50 page run of full page 50% Cyan on a Xerox DC250. The dashed curve is the simulated "within page" variation assuming that banding signature is learned from a first 10 pages using measurements from a scanner and then applied to the entire run. The dotted curve is the simulated "within page" variation assuming banding signature is learned from the first 10 pages from measurements by an inline ADC sensor. Notably, performance of inline and offline sensing on banding correction is similar. Additionally, signatures learned during cycle up (i.e., mimicked using the first 10 pages of the run) are valid during the remainder of the run.

The banding source signature detection can be carried out by applying coherent multipage FFT techniques to ADC data. Several pages of uniform halftone are printed during an initial cycle-up with the ADC in a continuous sampling mode. This is a relatively quick procedure and since the ADC has a narrow field of view, it uses only a small amount of toner. The ADC data for each page is stitched together to create a coherent signal y(t). A coherent FFT analyses is carried out to detect if any dominant banding sources $f_0^{(k)}$ are present. For each $k^{th}$ dominant banding source with frequency $f_0^{(k)}$, the associated actuator (e.g. exposure) correction profile $b_k(\mathrm{mod}(t,T_0^{(k)}))$ can be obtained using methods disclosed herein, where $T_0^{(k)}=1/f_0^{(k)}$. Note that t is defined to be the time from some fixed time, $T_{CS}$, shortly after the start of cycle up, where all the rotating mechanical components have reached their steady state velocity. The banding techniques disclosed herein assume that mechanical components that contribute to banding are at constant average speed at $T_{CS}$. Thus, the phase relationship at time t is relative to the initial phases at $T_{CS}$, which is where t=0. The overall correction to each color for banding compensation is $$b^i(t)=\sum_{k=1}^{n_s^i} b_k^i\left(\mathrm{Mod}\left(t,\, T_0^{(k)}\right)\right),$$

where $n_s^i$ is the number of dominant sources for color i, i=1 . . . 4 for Y, M, C and K. For additional information on the coherent multipage FFT analyses, see U.S. Pat. App. Publication No. 2011/0058186 to Ramesh et al., filed Sep. 8, 2009, Least Squares Based Coherent Multipage Analysis of Printer Banding for Diagnostics and Compensation, U.S. Pat. App. Publication No. 2011/0058226 to Ramesh et al., filed Sep. 8, 2009, Banding Profile Estimation using Spline Interpolation, and U.S. Pat. App. Publication No. 2011/0058184 to Ramesh et al., filed Sep. 8, 2009, Least Squares Based Exposure Modulation for Banding Compensation.

Figure 7:
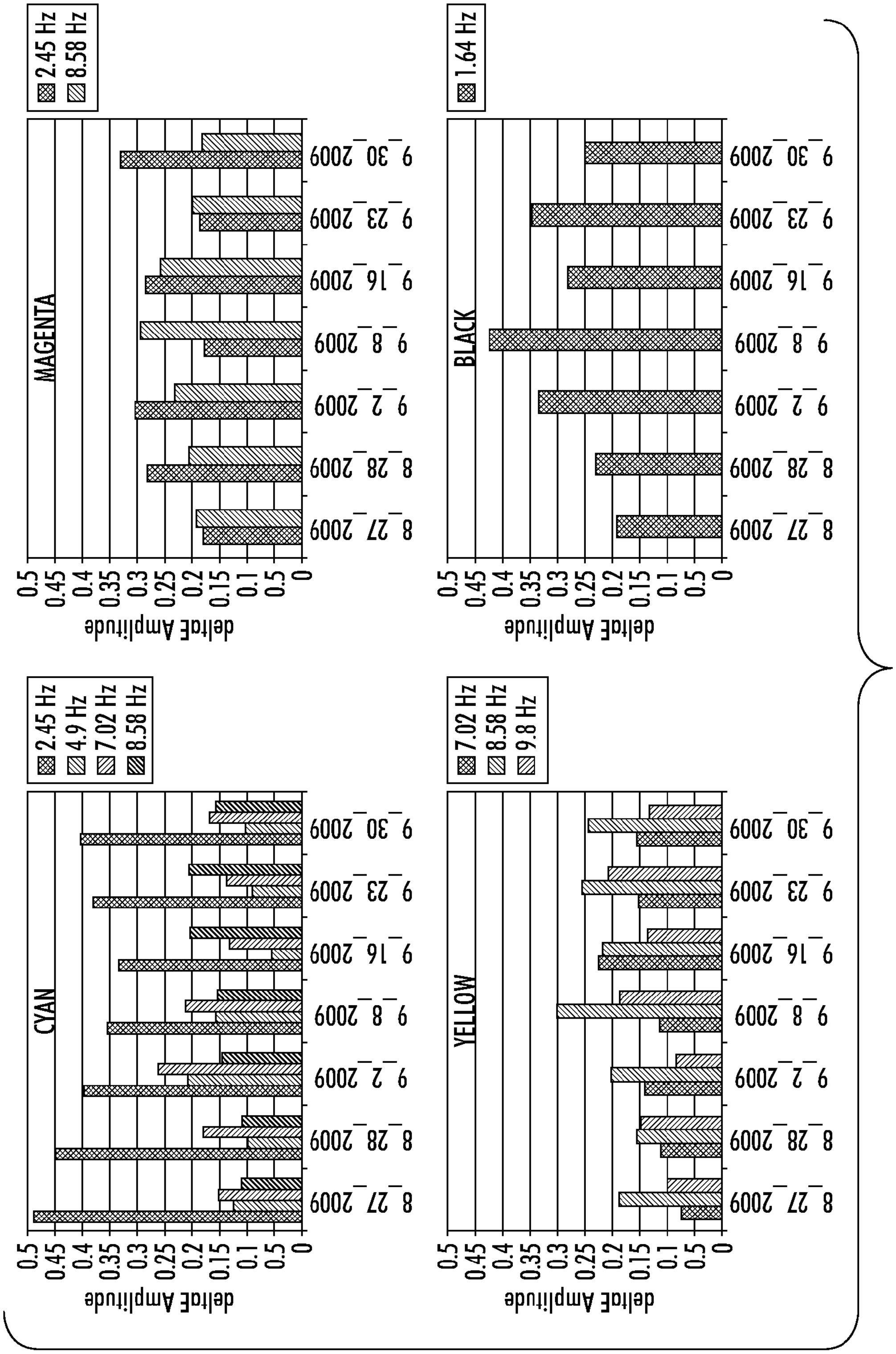
FIG. 7 is a set of graphs showing banding amplitude over time for each color separation in an exemplary marking platform. Graphs for cyan, magenta, yellow, and black are shown.

In most instances, banding signatures are quite persistent and consistent over time. For example, a study of drift in a Xerox DC700 tracked banding performance for a period of over a month. FIG. 7 shows the banding amplitude over time for 50% C, M, Y, and K halftone. The banding amplitudes in FIG. 7 show that the dominant frequencies for cyan are PR1× at 2.45 Hz and 4.9 Hz (i.e., first harmonic), BCR at 7.02 Hz, and developer roller at 8.58 Hz. For magenta, the dominant frequencies are PR1× at 2.45 Hz and developer roller at 8.58 Hz. The dominant frequencies for yellow are BCR at 7.02 Hz, developer roller at 8.58 Hz, and backup roller (BUR) at 9.8 Hz. For black, the dominant frequency is PR1× at 1.64 Hz. We observe that while dominant frequencies remain the same over time, their amplitudes can fluctuate. FIG. 8 shows a table of potential known banding sources and associated frequencies.

Figure 9:
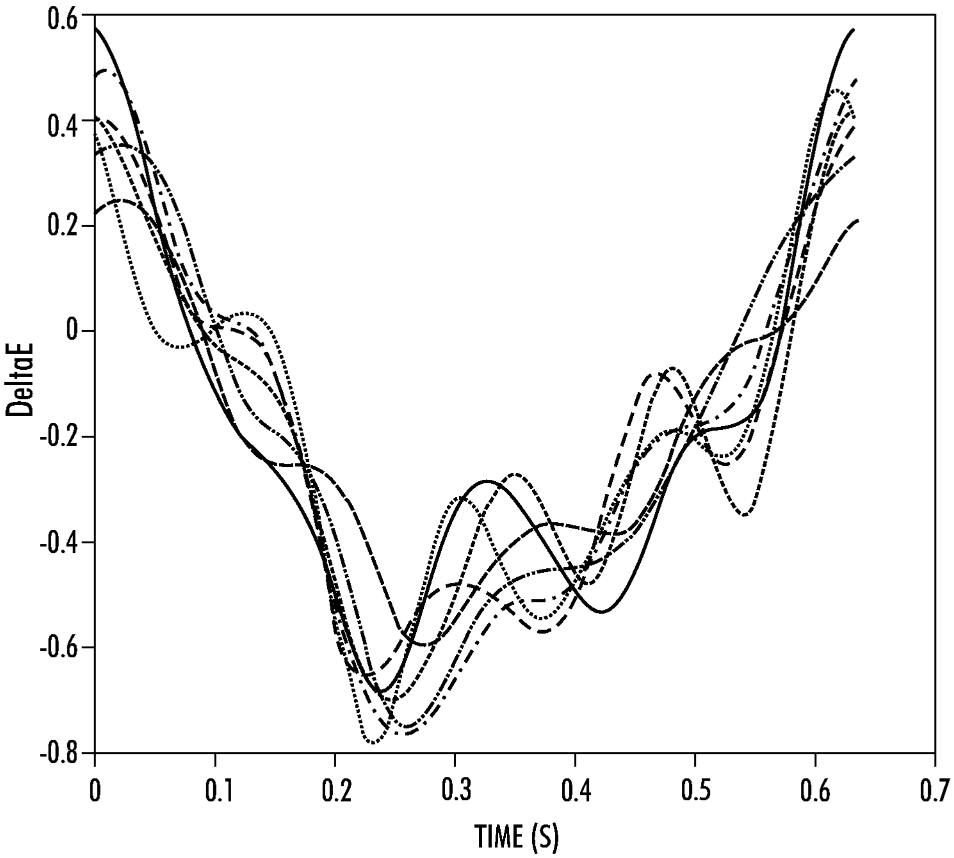
FIG. 9 is a graph showing a banding signature for cyan PR 1× in an exemplary marking platform.
Figure 10:
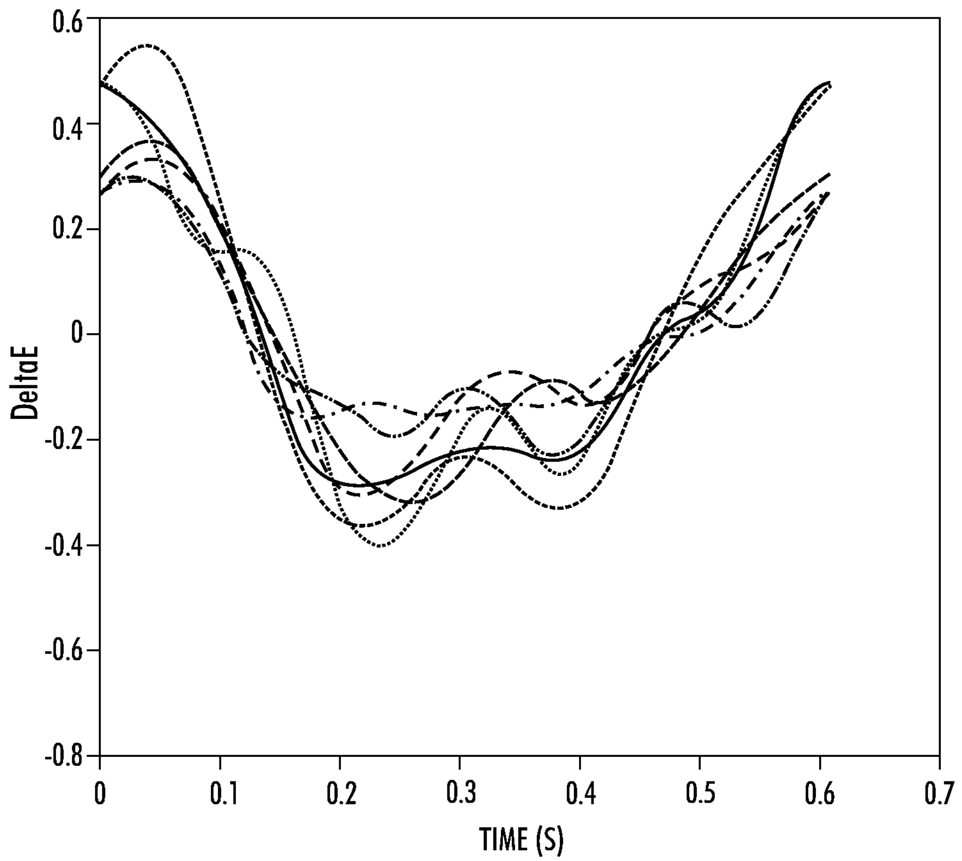
FIG. 10 is a graph showing a banding signature for black PR 1× in an exemplary marking platform.
Figure 11:
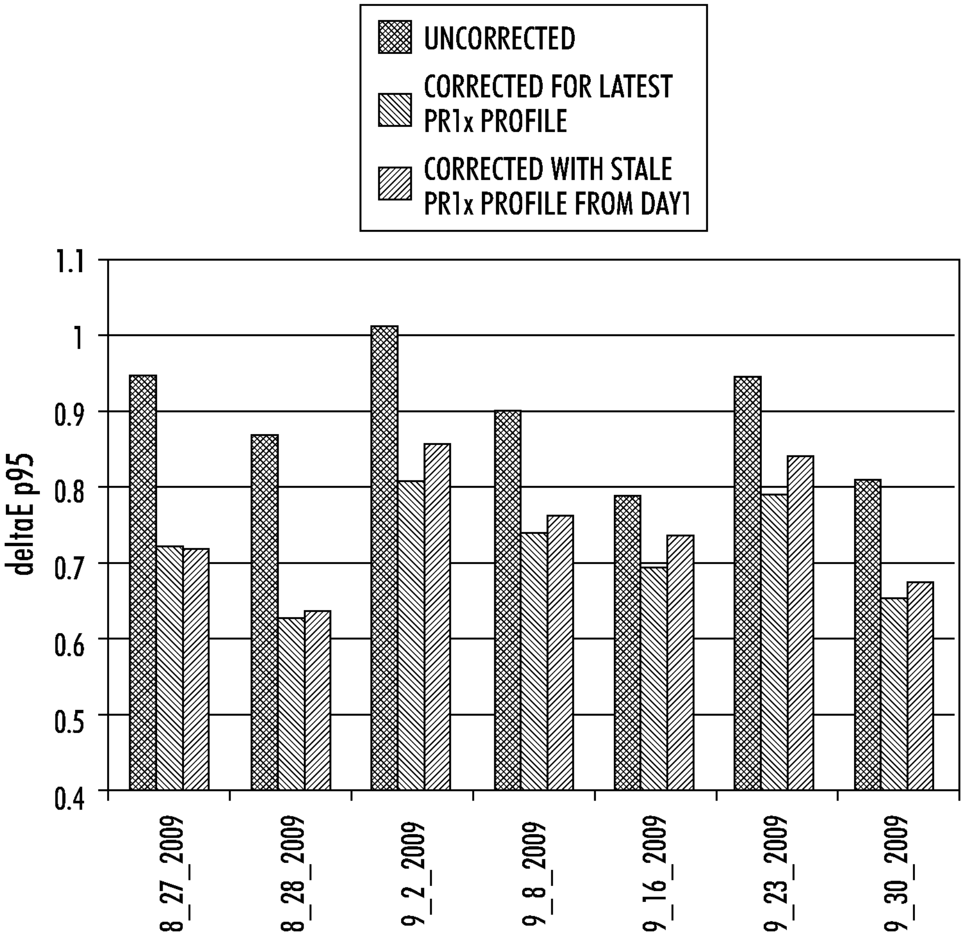
FIG. 11 is a graph showing an expected color uniformity for cyan PR 1× banding correction in an exemplary marking platform based on a corresponding banding signature.
Figure 12:
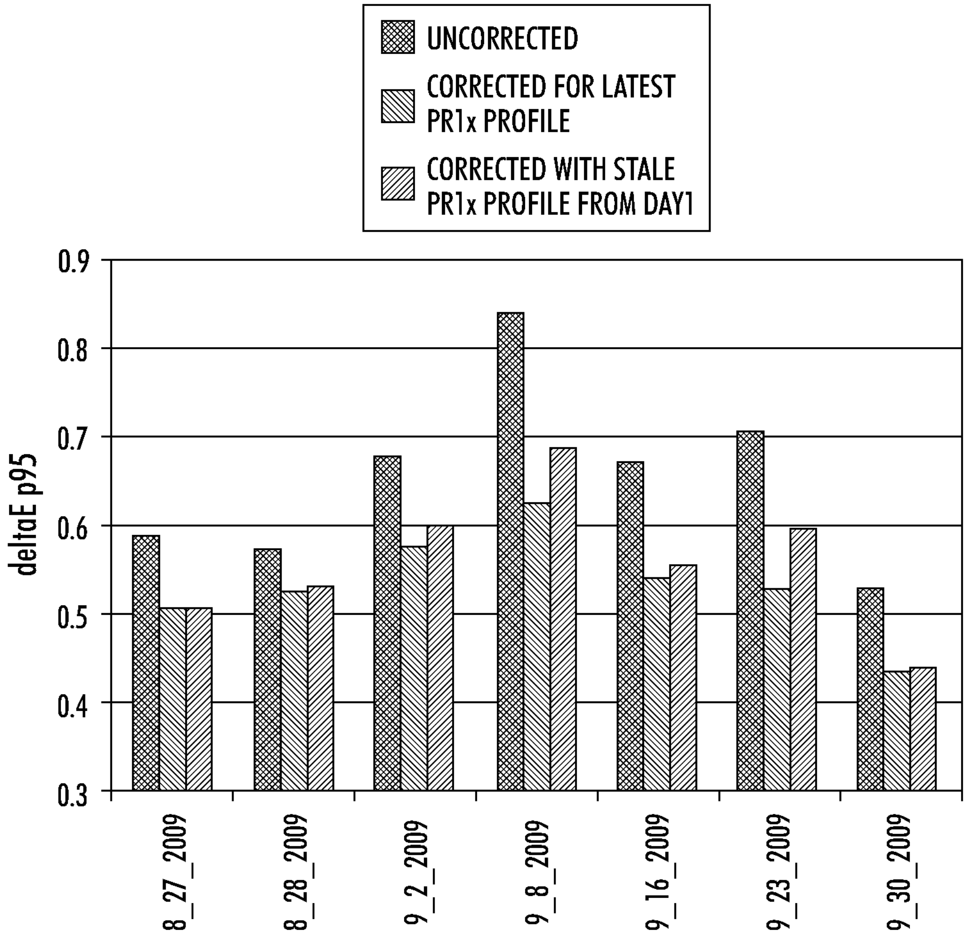
FIG. 12 is a graph showing an expected color uniformity for black PR 1× banding correction in an exemplary marking platform based on a corresponding banding signature.

FIG. 9 shows the Cyan PR 1× banding signature across several runs during the one month drift study. The black PR 1× banding signature across several runs during the study are shown in FIG. 10. Notably, the signature is fairly consistent over this period. FIG. 11 shows the expected color uniformity (deltaE p95) with Cyan PR 1× banding correction using the latest banding signature or a current banding signature from Day 1. The expected color uniformity (deltaE p95) with Black PR 1× banding correction using the latest banding signature or a current banding signature from Day 1 is shown in FIG. 12. While there is a slight drop off in performance with using current signature, it is not altogether unsatisfactory. The issue with using current banding signatures is to be able to phase reference the signature to the sources for each run. One option is to use 1× sensors on potential banding sources to phase-reference the current signature. This option would require less cycle-up time, but more hardware cost and may only be practical for higher end engines. Another option is to learn the phase reference (i.e., phase characteristics) of the banding signature during cycle up of each run (i.e., marking job). This may take a few additional test prints during cycle up, but less prints than that required for learning the full banding signature. Learning the phase reference for each run eliminates the need for 1× sensors.

Figure 13:
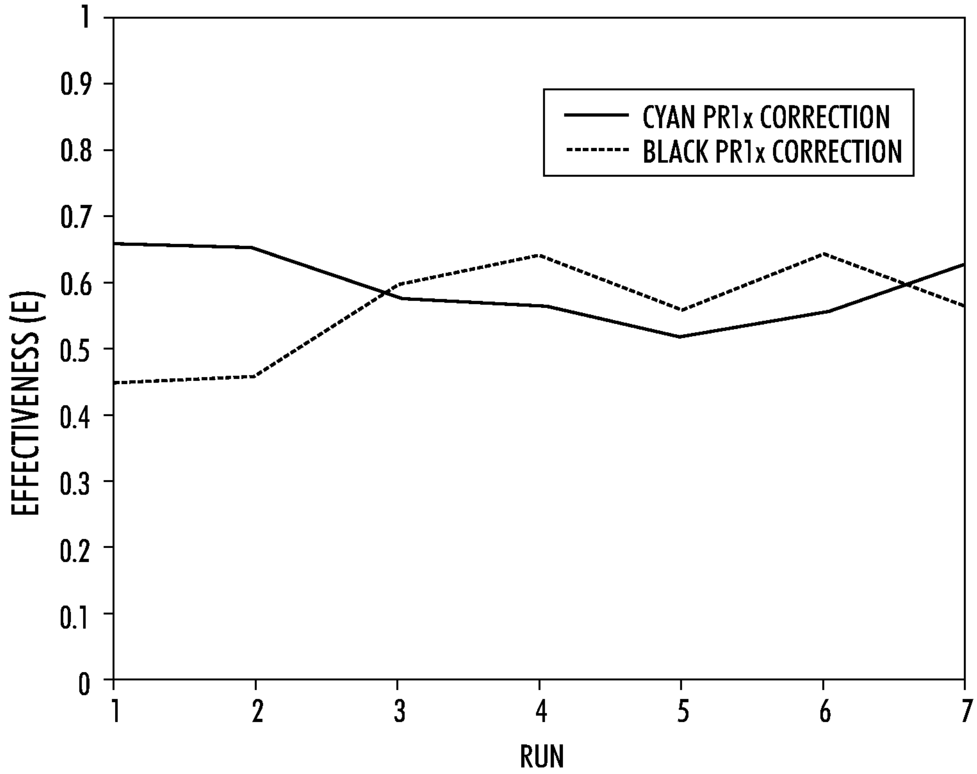
FIG. 13 is a graph showing a banding correction effectiveness metric for cyan PR 1× and black PR 1× profiles in an exemplary marking platform.

In general, the banding compensation profile applied during a run is given by $$b_j^i(t)=\sum_{k=1}^{n_s^i} b_k^i\left(\mathrm{Mod}\left(t+\frac{T_0^{(k)}}{2\pi}\left(\phi_{jk}^i-\phi_{lk}^i\right),\, T_0^{(k)}\right)\right),$$

where $\phi_{jk}^i$ is the phase reference for source k during run j and $\phi_{lk}^i$ is the phase reference for source k during the banding calibration run (run=1). $\phi_{jk}^i$ for source frequency $f_0^{(k)}$ is given by:

$$\phi_{jk}^i=\tan^{-1}\left(-\frac{\sum_i y_j^i(t)\mathrm{Sin}(2\pi f_0^k t)}{\sum_i y_j^i(t)\mathrm{Cos}(2\pi f_0^k t)}\right)$$

Where $y_j^i(t)$ is the ADC profile for color i for run j. In FIGS. 9 and 10, the profiles from the different runs are phase-adjusted using the above equation. Additionally, the effectiveness of the current profile $b_I$ obtained at run 1 at a subsequent run j may be obtained as a correlation between the ADC signal and the banding compensation profile:

$$E_j^i=\frac{C(y_j^i(t),\, b_j^i(t))}{\sqrt{C(y_j^i(t),\, y_j^i(t))C(b_j^i(t),\, b_j^i(t))}}$$

Where C(x,y) is the covariance of vectors x and y. If $E_j^i$ greater than a threshold, then new correction profiles are computed. FIG. 13 shows the banding correction effectiveness metric computed across the various runs in FIG. 11 for Cyan PR 1× and FIG. 12 for Black PR 1× correction based on profile learned from run 1.

Figure 14:
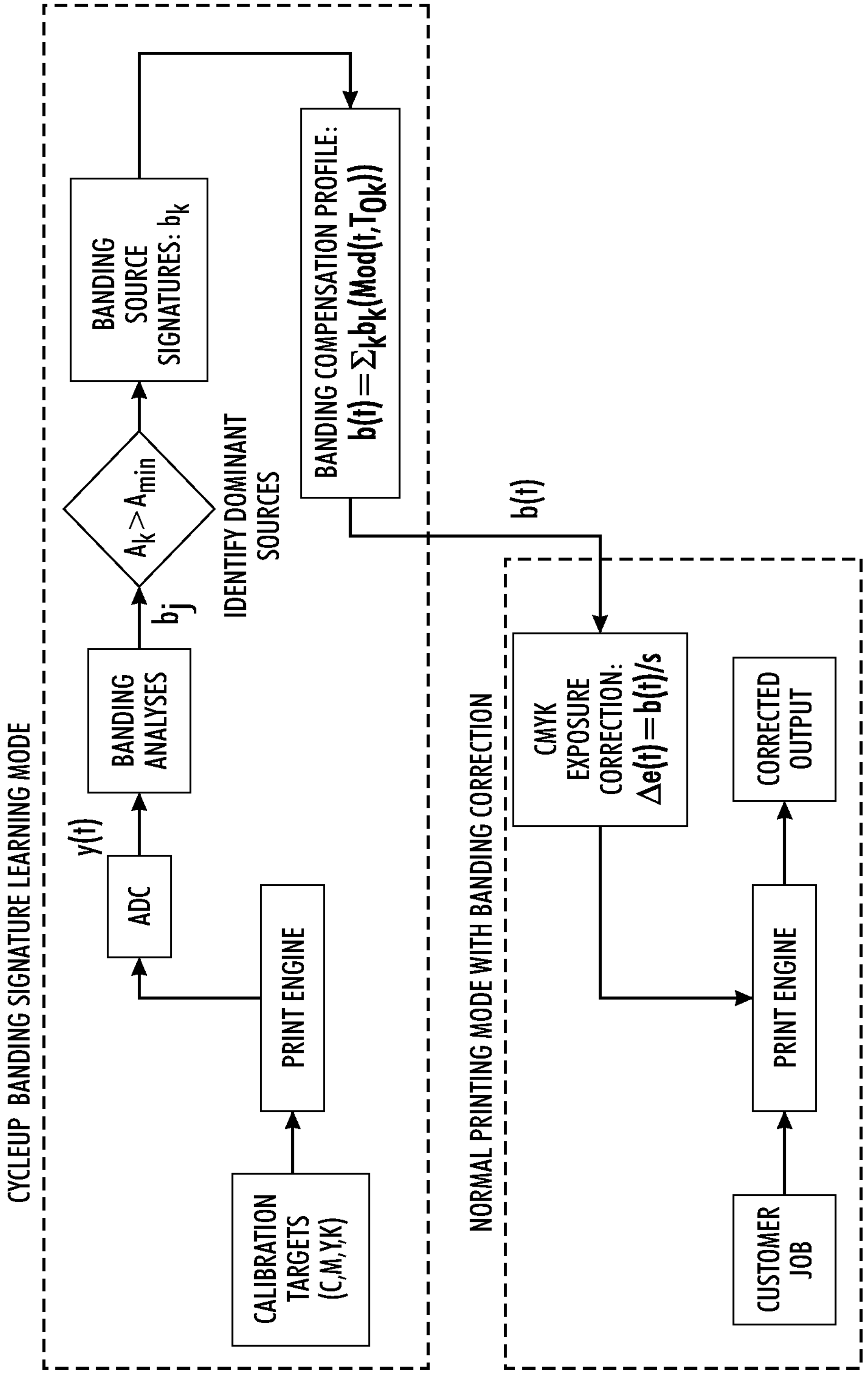
FIG. 14 is a block diagram of an exemplary embodiment of a marking platform with a signature learning mode during a cycle up stage and a banding correction stage during a normal printing mode.
Figure 15:
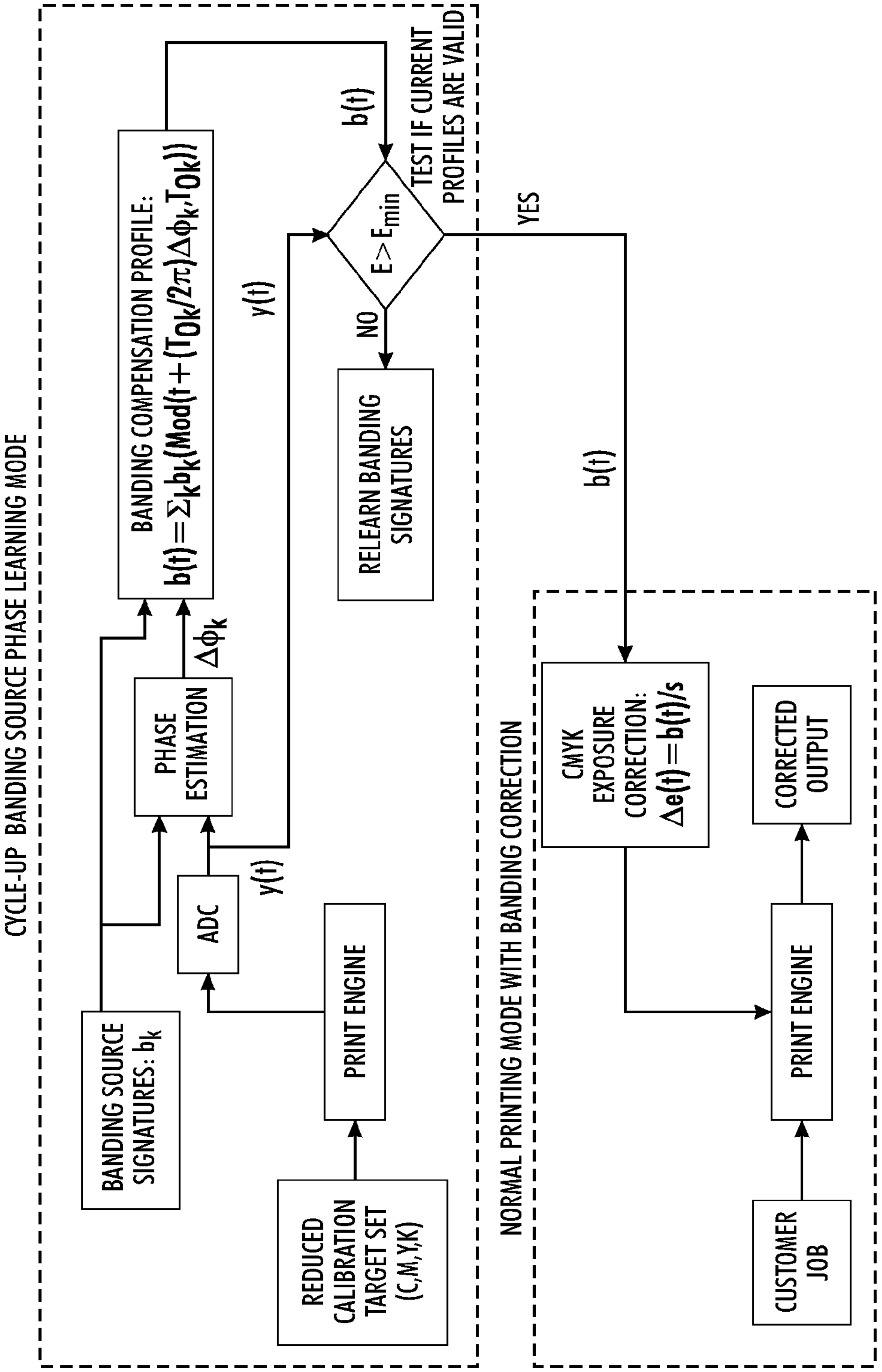
FIG. 15 is a block diagram of an exemplary embodiment of a marking platform with a phase learning mode during a cycle up stage and a banding correction stage during a normal printing mode.

FIGS. 14 and 15 show schematics of the banding compensation systems discussed herein. FIG. 14 describes an exemplary embodiment of a banding compensation system where banding signatures are learned during cycle-up and applied during customer printing. FIG. 15 shows an exemplary embodiment of a banding compensation system that uses current banding signatures but learns the phase of the source signatures during cycle up, estimates the effectiveness of the banding correction to see if the current signatures are still valid, and applies correction to the customer job or updates the banding signatures, as appropriate. In this embodiment, cycle-up includes phase detection and a feedback loop to update the banding signature.

To summarize, various exemplary embodiments of methods and systems for compensation of banding from multiple sources are provided herein. The system may include inline sensing and compensation of banding. The system may use existing sensors (e.g. ADC, ETAC, FWA) to learn banding signatures during cycle up and may apply the corresponding correction during the customer job. Both single source and multisource banding are considered. Additionally, this system permits the use of current banding signatures by learning the phase of the sources during cycle up and applying the corrections during the corresponding customer job. Finally, the system may monitor the effectiveness of the banding correction and may update signatures that no longer valid. Previous techniques have focused on offline measurement of banding signatures and open-loop correction.

The various embodiments of methods and systems for compensation of banding from multiple sources in a marking platform provide a technique for arbitrary constant average velocity sources, a technique that does not require 1× sensors for phase alignment, a technique that learns the banding signature from multiple banding sources at cycle up, a technique that learns the phase relationships between multiple banding sources at cycle up, and a metric that determines if a banding signature remain valid.

The banding compensation method disclosed herein does not require a priori information about the banding sources and can compensate for all constant average velocity sources is advantageous because printing systems may have many unforeseen sources due to many mechanical devices, but also due to ancillary rollers within the system and their harmonics. Further, these sources may pop up in unpredictable operating conditions and at various unpredictable ages of the components. Additionally, the banding compensation method disclosed herein does not use 1× sensors on potential banding source components. This leads to lower material costs per system. The banding compensation method disclosed herein learns banding signatures at cycle up. This is permits the system to track banding signature changes from job-to-job. A metric that determines if a banding signature has changed can be used to determine when a new signature should be learned and can thus track changing banding signatures.

Figure 16:
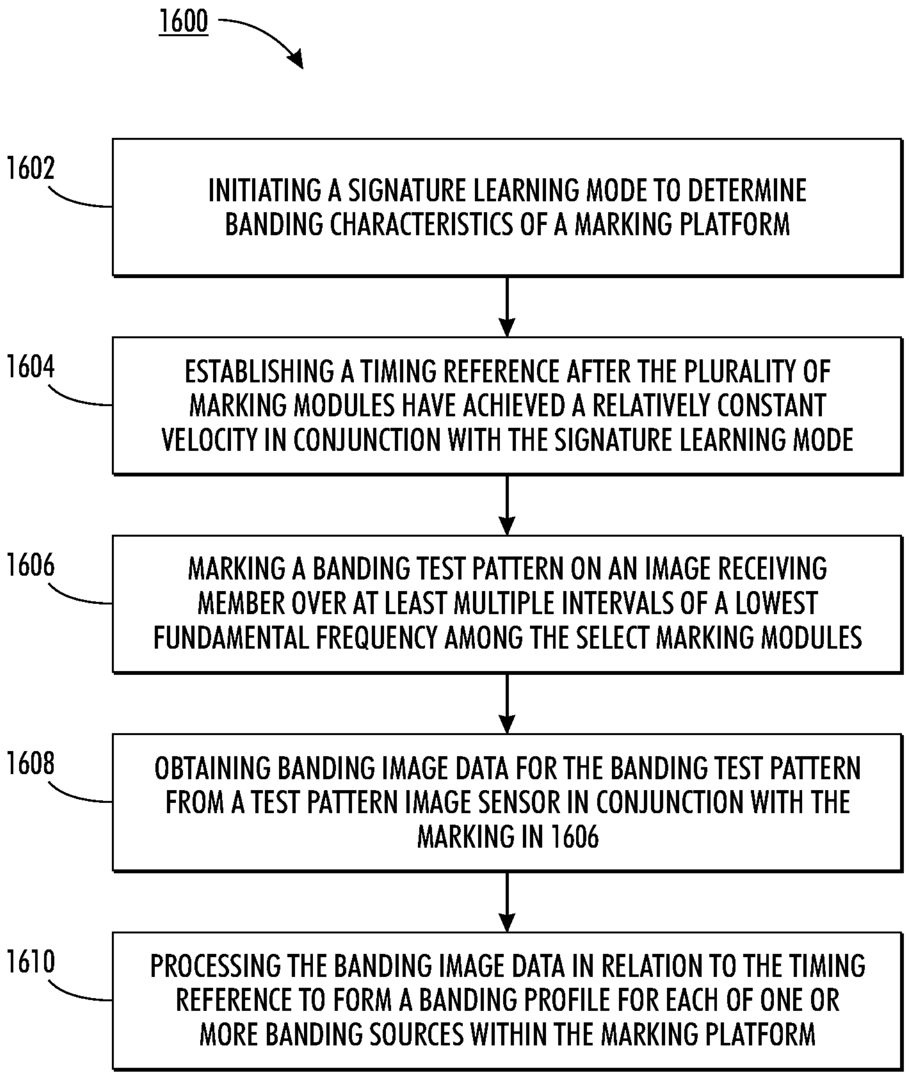
FIG. 16 is a flowchart showing an exemplary embodiment of a process for compensation of banding in a marking platform.

With reference to FIG. 16, an exemplary embodiment of a process 1600 for compensation of banding in a marking platform begins at 1602 where a signature learning mode to determine banding characteristics of a marking platform may be initiated. The marking platform may include a plurality of marking modules at least a portion of which are select marking modules. Each select marking module may be a potential banding source such that a fundamental frequency for banding characteristics associated with each select marking module may be known.

Next, a timing reference may be established after the plurality of marking modules have achieved a relatively constant velocity in conjunction with the signature learning mode (1604). At 1606, a banding test pattern may be marked on an image receiving member over at least multiple intervals of a lowest fundamental frequency among the fundamental frequencies for the select marking modules. Next, banding image data for the banding test pattern may be obtained from a test pattern image sensor in conjunction with the marking in 1606 (1608). At 1610, the banding image data may be processed in relation to the timing reference to form a banding profile for each of one or more banding sources within the marking platform. The fundamental frequency for each banding source may be used to determine banding characteristics attributed to the corresponding banding source and filter banding characteristics not attributed to the corresponding banding source for the corresponding banding profile. Each banding profile may reflect a phase relation of amplitude and frequency banding characteristics to the timing reference for the corresponding banding source.

In another embodiment of the process 1600, the fundamental frequency for each select marking module may be provided in a storage device. In this embodiment, the process may also include obtaining the fundamental frequency for each select marking module from the storage device in conjunction with the marking in 1606 such that the processing of the banding image data to form banding profiles in 1610 is also in relation to the fundamental frequencies.

In yet another embodiment, the process 1600 may also include determining the fundamental frequency for each banding source in conjunction with processing the banding image data in 1610. Banding sources may be matched to select marking modules based at least in part on matching the determined fundamental frequencies for the banding sources to the known fundamental frequencies for the select marking modules. The banding image data and corresponding banding profile associated with any banding source that is not matched to any select marking module may be filtered from further consideration in relation to compensation of banding. Alternatively, the banding image data and corresponding banding profile associated with any banding source that is not matched to any select marking module may be associated with a default marking module for further consideration in relation to compensation of banding.

In still another embodiment of the process 1600, the image receiving member in 1606 may be a target media sheet in a select media size and the banding test pattern may be marked over a plurality of target media sheets. The fundamental frequency associated with each banding source and the timing reference may be used to arrange the banding image data from the plurality of target media sheets in time relation to construct the banding profiles for the banding sources in conjunction with the processing in 1610.

In still yet another embodiment, the process 1600 may also include determining at least one amplitude value in one or more banding profiles from 1610 exceed a corresponding amplitude threshold to identify dominant banding profiles and corresponding dominant banding sources. Each dominant banding profile may be processed to form a dominant banding signature for the corresponding dominant banding source. Each dominant banding signature may reflect the phase relation of amplitude and frequency banding characteristics over at least one sample period of the corresponding fundamental frequency for the corresponding dominant banding source. In this embodiment, the dominant banding signature matches the dominant banding profile because the phase relationship of the banding signature relative to the timing reference matches that of the banding profile.

In relation to the embodiment being described, in a further embodiment of the process 1600 the signature learning mode may be initiated in 1602 in conjunction with a cycle up stage for processing a marking job. In this embodiment, the process 1600 may also include periodically processing the dominant banding signatures in relation to the timing reference established in 1604 to determine a current banding compensation value for the marking platform in conjunction with processing the marking job. The timing reference established in 1604 may be used to combine the corresponding dominant banding signatures in time relation to determine the current banding compensation value. A correction stage may be initiated in a normal printing mode for banding compensation of the marking platform in conjunction with processing the marking job. Each banding compensation value may be processed to determine one or more current banding correction values for one or more corresponding adjustable marking modules such that drive signals to the one or more adjustable marking modules are adjusted by the corresponding banding correction value in conjunction with processing the marking job. The marking job may be processed using the one or more current banding correction values for the one or more adjustable marking modules.

In relation to the embodiment described in paragraph 59, another further embodiment of the process 1600 may include initiating a cycle up stage in a phase learning mode to determine phase banding characteristics for each dominant banding signature in conjunction with processing a marking job. A second timing reference may be established after the plurality of marking modules have achieved a relatively constant velocity in conjunction with the cycle up stage. A second banding test pattern may be marked on the image receiving member over at least multiple intervals of the lowest fundamental frequency among the select marking modules. Banding image data for the second banding test pattern may be obtained from the test pattern image sensor in conjunction with marking the second banding test pattern. The banding image data for the second banding test pattern may be processed with each dominant banding signature in relation to the second timing reference to form a corresponding banding phase estimate for each dominant banding signature in conjunction with processing the marking job.

In relation to the embodiment being described, a further embodiment of the process 1600 may include periodically processing each dominant banding signature with the corresponding banding phase estimate in relation to the second timing reference to determine a current banding compensation value for the marking platform. The second timing reference may be used to combine the corresponding dominant banding signatures in time relation to determine the current banding compensation value. A correction stage may be initiated in a normal printing mode for banding compensation of the marking platform in conjunction with processing the marking job. Each banding compensation value may be processed to determine one or more current banding correction values for one or more corresponding adjustable marking modules such that drive signals to the one or more adjustable marking modules may be adjusted by the corresponding banding correction value in conjunction with processing the marking job. The marking job may be processed using the one or more current banding correction values for the one or more adjustable marking modules.

In relation to the embodiment described in paragraph 61, another further embodiment of the process 1600 may include periodically processing the dominant banding signatures with the corresponding banding phase estimates in relation to the second timing reference to determine a current banding compensation value for the marking platform. The second timing reference may be used to combine the dominant banding signatures in time relation to determine the current banding compensation value. The current banding compensation value may be correlated with the banding image data for the second banding test pattern in relation to the second timing reference to determine a corresponding current effectiveness metric. The process 1600 may determine at least one current effectiveness metric exceeds a corresponding effectiveness threshold. The process 1600 may continue by repeating 1602 through 1610 to re-learn banding signatures for banding sources of the marking platform.

Figure 17:
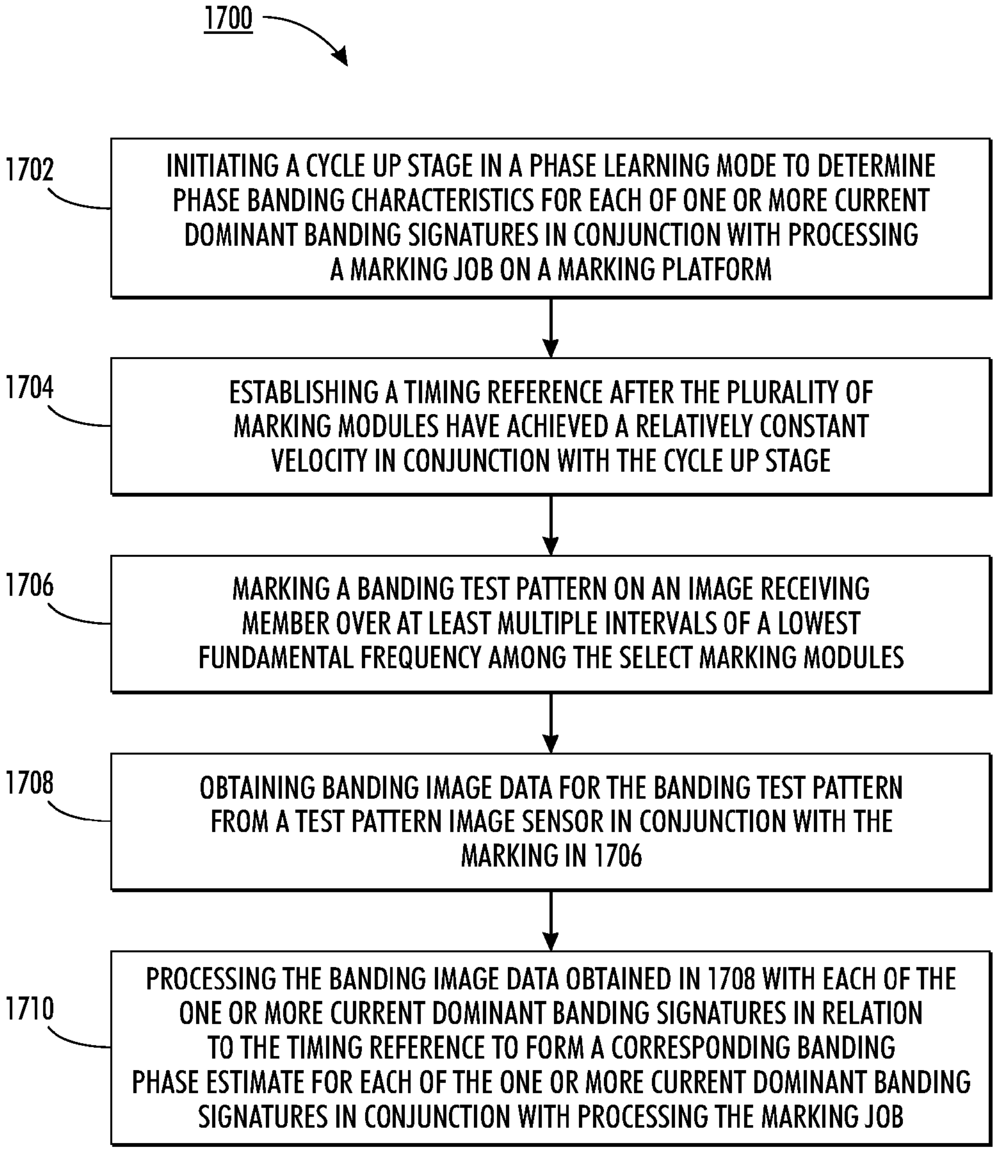
FIG. 17 is a flowchart showing another exemplary embodiment of a process for compensation of banding in a marking platform.

With reference to FIG. 17, another exemplary embodiment of a process 1700 for compensation of banding in a marking platform begins at 1702 where a cycle up stage may be initiated in a phase learning mode to determine phase banding characteristics for each of one or more current dominant banding signatures in conjunction with processing a marking job on a marking platform. The marking platform may include a plurality of marking modules at least a portion of which are select marking modules. Each select marking module may be a potential banding source such that a fundamental frequency for banding characteristics associated with each select marking module may be known. Each dominant banding signature may reflect amplitude and frequency banding characteristics over at least one sample period of the corresponding fundamental frequency for corresponding dominant banding sources.

Next, a timing reference may be established after the plurality of marking modules have achieved a relatively constant velocity in conjunction with the cycle up stage (1704). At 1706, a banding test pattern may be marked on an image receiving member over at least multiple intervals of a lowest fundamental frequency among the select marking modules. Next, banding image data for the banding test pattern may be obtained from a test pattern image sensor in conjunction with the marking in 1706 (1708). At 1710, the banding image data obtained in 1708 may be processed with each of the one or more current dominant banding signatures in relation to the timing reference to form a corresponding banding phase estimate for each of the one or more current dominant banding signatures in conjunction with processing the marking job.

In another embodiment, the process 1700 may also include periodically processing each of the one or more current dominant banding signatures with the corresponding banding phase estimate formed in 1710 in relation to the timing reference established in 1704 to determine a current banding compensation value for the marking platform. The timing reference established in 1704 may be used to combine the corresponding current dominant banding signatures in time relation to determine the current banding compensation value. A correction stage may be initiated in a normal printing mode for banding compensation of the marking platform in conjunction with processing the marking job. Each banding compensation value may be processed to determine one or more current banding correction values for one or more corresponding adjustable marking modules such that drive signals to the one or more adjustable marking modules may be adjusted by the corresponding banding correction value in conjunction with processing the marking job. The marking job may be processed using the one or more current banding correction values for the one or more adjustable marking modules.

In yet another embodiment, the process 1700 may also include periodically processing each of the one or more current dominant banding signatures with the corresponding banding phase estimates formed in 1710 in relation to the timing reference established in 1704 to determine a current banding compensation value for the marking platform. The timing reference established in 1704 may be used to combine the current dominant banding signatures in time relation to determine the current banding compensation value. The current banding compensation value may be correlated with the banding image data obtained in 1708 in relation to the timing reference established in 1704 to determine a corresponding current effectiveness metric. The process may determine at least one current effectiveness metric exceeds a corresponding effectiveness threshold.

In relation to the embodiment being described, a further embodiment of the process 1700 may include initiating a signature learning mode in conjunction with the cycle up stage to determine banding characteristics of the marking platform. A second timing reference may be established after the plurality of marking modules have achieved a relatively constant velocity in conjunction with the signature learning mode. A second banding test pattern may be marked on the image receiving member over at least multiple intervals of the lowest fundamental frequency among the select marking modules. Banding image data for the second banding test pattern may be obtained from the test pattern image sensor in conjunction with marking the second banding test pattern. The banding image data for the second banding test pattern may be processed in relation to the second timing reference to form banding profiles for one or more banding sources within the marking platform. The fundamental frequency for each banding source may be used to determine banding characteristics attributed to the corresponding banding source and filter banding characteristics not attributed to the corresponding banding source for the corresponding banding profile. Each banding profile may reflect a phase relation of amplitude and frequency banding characteristics to the second timing reference for the corresponding banding source in relation to the second banding test pattern. The process may determine at least one amplitude value in one or more banding profiles exceed a corresponding amplitude threshold to identify dominant banding profiles and corresponding dominant banding sources. Each dominant banding profile may be processed to form dominant banding signatures for the corresponding dominant banding sources. Each dominant banding signature may reflect the phase relation of amplitude and frequency banding characteristics over at least one sample period of the corresponding fundamental frequency for the corresponding dominant banding source.

In still another embodiment, the process 1700 may also include, prior to the cycle up stage, initiating a signature learning mode to determine banding characteristics of the marking platform. A second timing reference may be established after the plurality of marking modules have achieved a relatively constant velocity in conjunction with the signature learning mode. A second banding test pattern may be marked on the image receiving member over at least multiple intervals of the lowest fundamental frequency among the select marking modules. Banding image data for the second banding test pattern may be obtained from the test pattern image sensor in conjunction with marking the second banding test pattern. The banding image data associated with the second banding test pattern may be processed in relation to the second timing reference to form banding profiles for one or more banding sources within the marking platform. The fundamental frequency for each banding source may be used to determine banding characteristics attributed to the corresponding banding source and filter banding characteristics not attributed to the corresponding banding source for the corresponding banding profile. Each banding profile may reflect a phase relation of amplitude and frequency banding characteristics to the second timing reference for the corresponding banding source in relation to the second banding test pattern. The process may determine at least one amplitude value in one or more banding profiles exceed a corresponding amplitude threshold to identify dominant banding profiles and corresponding dominant banding sources. Each dominant banding profile may be processed to form dominant banding signatures for the corresponding dominant banding sources. Each dominant banding signature may reflect the phase relation of amplitude and frequency banding characteristics over at least one sample period of the corresponding fundamental frequency for the corresponding dominant banding source.

Figure 18:
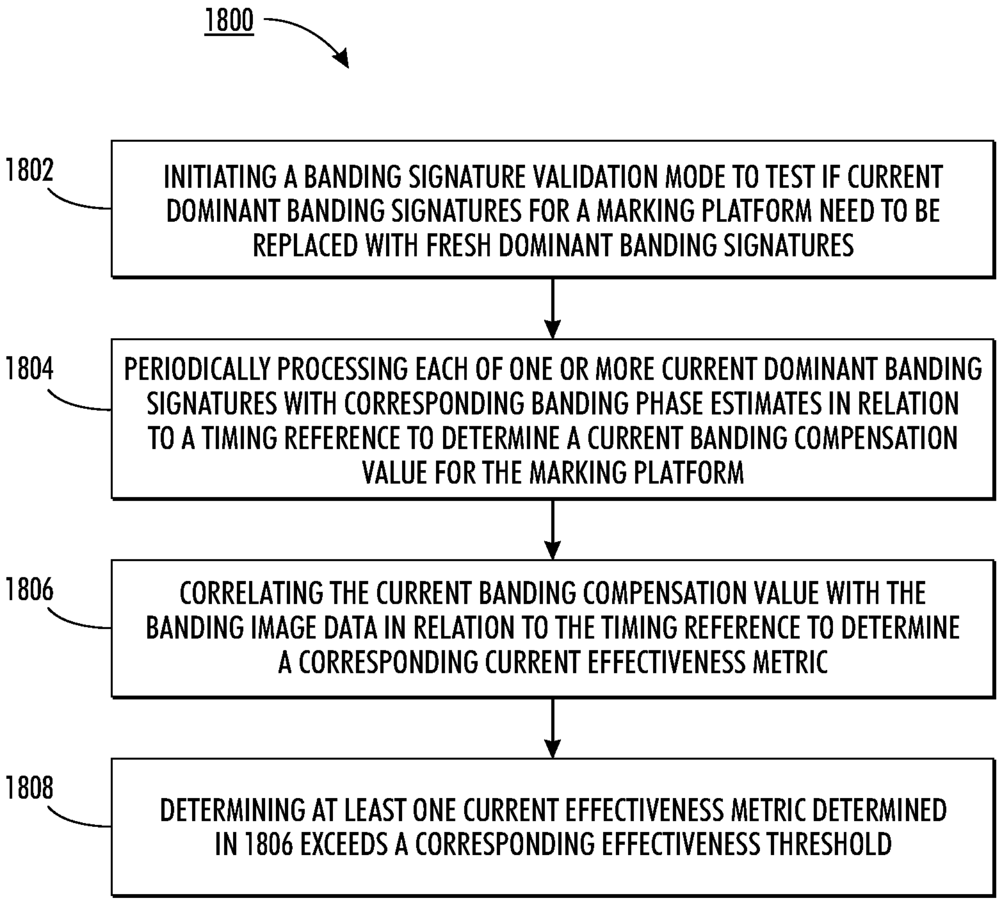
FIG. 18 is a flowchart showing yet another exemplary embodiment of a process for compensation of banding in a marking platform.

With reference to FIG. 18, yet another exemplary embodiment of a process 1800 for compensation of banding in a marking platform begins at 1802 where a banding signature validation mode may be initiated to test if current dominant banding signatures for a marking platform need to be replaced with fresh dominant banding signatures. The marking platform may include a plurality of marking modules at least a portion of which are select marking modules. Each select marking module may be a potential banding source such that a fundamental frequency for banding characteristics associated with each select marking module may be known. Each current dominant banding signature may reflect amplitude and frequency banding characteristics over at least one sample period of the corresponding fundamental frequency for corresponding dominant banding sources.

Next, each of one or more current dominant banding signatures may be periodically processed with corresponding banding phase estimates in relation to a timing reference to determine a current banding compensation value for the marking platform (1804). Each banding phase estimate formed from banding image data may be associated with a banding test pattern. Each banding phase estimate may be processed using the corresponding current dominant banding signature in relation to the timing reference. The timing reference may be established after the plurality of marking modules achieve a relatively constant velocity in conjunction with the banding signature validation mode. The timing reference may be used to combine the dominant banding signatures in time relation to determine the current banding compensation value. At 1806, the current banding compensation value may be correlated with the banding image data in relation to the timing reference to determine a corresponding current effectiveness metric. Next, the process may determine at least one current effectiveness metric determined in 1806 exceeds a corresponding effectiveness threshold (1808).

In another embodiment, the process 1800 may also include initiating a signature learning mode to determine banding characteristics of the marking platform. A second timing reference may be established after the plurality of marking modules have achieved a relatively constant velocity in conjunction with the signature learning mode. A second banding test pattern may be marked on the image receiving member over at least multiple intervals of the lowest fundamental frequency among the select marking modules. Banding image data for the second banding test pattern may be obtained from a test pattern image sensor in conjunction with the marking of the second banding test pattern. The banding image data may be processed in relation to the second timing reference to form banding profiles for one or more banding sources within the marking platform. The fundamental frequency for each banding source may be used to determine banding characteristics attributed to the corresponding banding source and filter banding characteristics not attributed to the corresponding banding source for the corresponding banding profile. Each banding profile may reflect a phase relation of amplitude and frequency banding characteristics to the second timing reference for the corresponding banding source in relation to the second banding test pattern. The process may determine at least one amplitude value in one or more banding profiles exceed a corresponding amplitude threshold to identify dominant banding profiles and corresponding dominant banding sources. Each dominant banding profile may be processed to form the fresh dominant banding signatures for the corresponding dominant banding sources. Each fresh dominant banding signature may reflect the phase relation of amplitude and frequency banding characteristics over at least one sample period of the corresponding fundamental frequency for corresponding dominant banding sources.

In yet another embodiment, the process 1800 may also include, prior to the banding signature validation mode, initiating a signature learning mode to determine banding characteristics of the marking platform. A second timing reference may be established after the plurality of marking modules have achieved a relatively constant velocity in conjunction with the signature learning mode. A second banding test pattern may be marked on the image receiving member over at least multiple intervals of the lowest fundamental frequency among the select marking modules. Banding image data for the second banding test pattern may be obtained from a test pattern image sensor in conjunction with the marking of the second banding test pattern. The banding image data may be processed in relation to the second timing reference to form banding profiles for one or more banding sources within the marking platform. The fundamental frequency for each banding source may be used to determine banding characteristics attributed to the corresponding banding source and filter banding characteristics not attributed to the corresponding banding source for the corresponding banding profile. Each banding profile may reflect a phase relation of amplitude and frequency banding characteristics to the second timing reference for the corresponding banding source in relation to the second banding test pattern. The process may determine at least one amplitude value in one or more banding profiles exceed a corresponding amplitude threshold to identify dominant banding profiles and corresponding dominant banding sources. Each dominant banding profile may be processed to form the dominant banding signatures referred to as current dominant banding signatures in 1802.

In still another embodiment, the process 1800 may also include, prior to the banding signature validation mode, initiating a cycle up stage in a phase learning mode to determine phase banding characteristics for each of the one or more current dominant banding signatures in conjunction with processing a marking job on the marking platform. The timing reference may be established after the plurality of marking modules have achieved a relatively constant velocity in conjunction with the cycle up stage. The banding test pattern may be marked on an image receiving member over at least multiple intervals of a lowest fundamental frequency among the select marking modules. The banding image data for the banding test pattern may be obtained from a test pattern image sensor in conjunction with the marking of the banding test pattern. The banding image data may be processed with each of the one or more current dominant banding signatures in relation to the timing reference to form the corresponding banding phase estimate for each of the one or more current dominant banding signatures in conjunction with processing the marking job.

Figure 19:
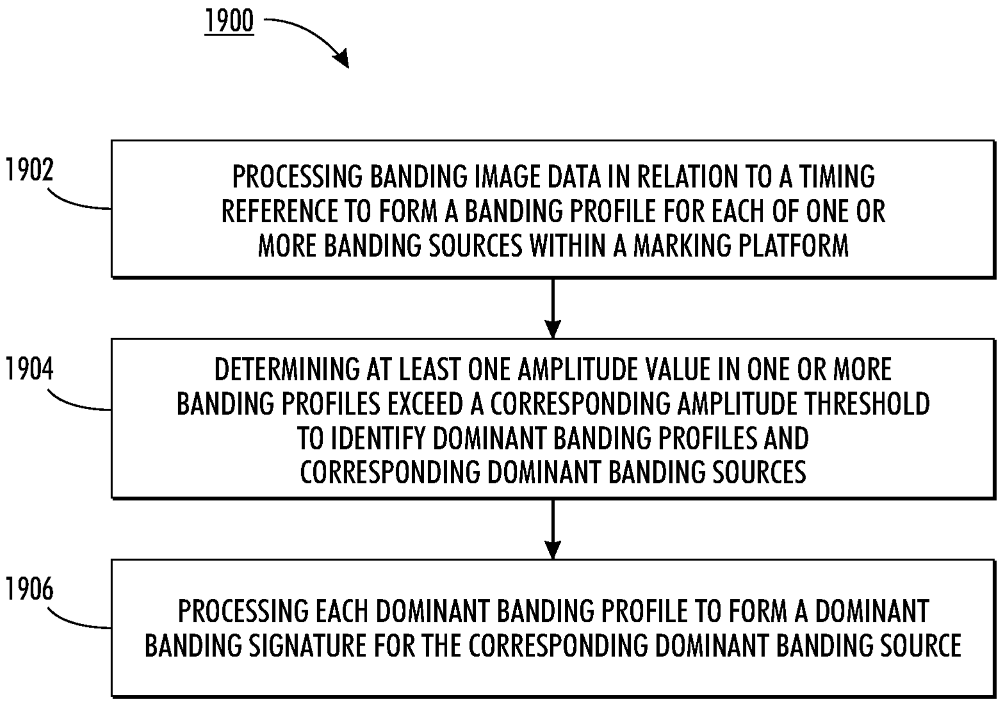
FIG. 19 is a flowchart showing still another exemplary embodiment of a process for compensation of banding in a marking platform.

With reference to FIG. 19, still another exemplary embodiment of a process 1900 for compensation of banding in a marking platform begins at 1902 where banding image data may be processed in relation to a timing reference to form a banding profile for each of one or more banding sources within a marking platform. The marking platform may include a plurality of marking modules at least a portion of which are select marking modules. Each select marking module may be a potential banding source such that a fundamental frequency for banding characteristics associated with each select marking module may be known. The fundamental frequency for each banding source may be used to determine banding characteristics attributed to the corresponding banding source and filter banding characteristics not attributed to the corresponding banding source for the corresponding banding profile. Each banding profile may reflect a phase relation of amplitude and frequency banding characteristics to the timing reference for the corresponding banding source in relation to a banding test pattern.

Next, the process may determine at least one amplitude value in one or more banding profiles exceed a corresponding amplitude threshold to identify dominant banding profiles and corresponding dominant banding sources (1904). At 1906, each dominant banding profile may be processed to form a dominant banding signature for the corresponding dominant banding source. Each dominant banding signature may reflect the phase relation of amplitude and frequency banding characteristics over at least one sample period of the corresponding fundamental frequency for the corresponding dominant banding source.

In another embodiment of the process 1900, the signature learning mode may be initiated in 1902 in conjunction with a cycle up stage for processing a marking job. In this embodiment, the process 1900 may also include periodically processing the dominant banding signatures formed in 1906 in relation to the timing reference to determine a current banding compensation value for the marking platform in conjunction with processing the marking job. The timing reference may be used to combine the corresponding dominant banding signatures in time relation to determine the current banding compensation value. A correction stage may be initiated in a normal printing mode for banding compensation of the marking platform in conjunction with processing the marking job. Each banding compensation value may be processed to determine one or more current banding correction values for one or more corresponding adjustable marking modules such that drive signals to the one or more adjustable marking modules may be adjusted by the corresponding banding correction value in conjunction with processing the marking job. The marking job may be processed using the one or more current banding correction values for the one or more adjustable marking modules.

In yet another embodiment, the process 1900 may also include initiating a cycle up stage in a phase learning mode to determine phase banding characteristics for each dominant banding signature formed in 1906 in conjunction with processing a marking job. A second timing reference may be established after the plurality of marking modules have achieved a relatively constant velocity in conjunction with the cycle up stage. A second banding test pattern may be marked on the image receiving member over at least multiple intervals of the lowest fundamental frequency among the select marking modules. Banding image data for the second banding test pattern may be obtained from the test pattern image sensor in conjunction with the marking of the second banding test pattern. The banding image data may be processed with each dominant banding signature formed in 1906 in relation to the second timing reference to form a corresponding banding phase estimate for each dominant banding signature formed in 1906 in conjunction with processing the marking job.

In relation to the embodiment being described, a further embodiment of the process 1900 may include periodically processing each dominant banding signature formed in 1906 with the corresponding banding phase estimate in relation to the second timing reference to determine a current banding compensation value for the marking platform. The second timing reference may be used to combine the corresponding dominant banding signatures in time relation to determine the current banding compensation value. A correction stage may be initiated in a normal printing mode for banding compensation of the marking platform in conjunction with processing the marking job. Each banding compensation value may be processed to determine one or more current banding correction values for one or more corresponding adjustable marking modules such that drive signals to the one or more adjustable marking modules may be adjusted by the corresponding banding correction value in conjunction with processing the marking job. The marking job may be processed using the one or more current banding correction values for the one or more adjustable marking modules.

In relation to the embodiment described in paragraph 78, another further embodiment of the process 1900 may include periodically processing the dominant banding signatures formed in 1906 with the corresponding banding phase estimates in relation to the second timing reference to determine a current banding compensation value for the marking platform. The second timing reference may be used to combine the dominant banding signatures in time relation to determine the current banding compensation value. The current banding compensation value may be correlated with the banding image data for the second banding test pattern in relation to the second timing reference to determine a corresponding current effectiveness metric. The process may determine at least one current effectiveness metric determined exceeds a corresponding effectiveness threshold.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for compensation of banding in a marking platform, comprising:

a) initiating a signature learning mode to determine banding characteristics of a marking platform, the marking platform comprising a plurality of marking modules at least a portion of which are select marking modules, each select marking module being a potential banding source such that a fundamental frequency for banding characteristics associated with each select marking module is known;

b) establishing a timing reference after the plurality of marking modules have achieved a relatively constant velocity in conjunction with the signature learning mode;

c) marking a banding test pattern on an image receiving member over at least multiple intervals of a lowest fundamental frequency among the select marking modules;

d) obtaining banding image data for the banding test pattern from a test pattern image sensor in conjunction with the marking in c); and e) processing the banding image data in relation to the timing reference to form a banding profile for each of one or more banding sources within the marking platform, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the timing reference for the corresponding banding source.

2. The method set forth in claim 1 wherein the fundamental frequency for each select marking module is provided in a storage device, the method further comprising:

f) obtaining the fundamental frequency for each select marking module from the storage device in conjunction with the marking in c) such that the processing of the banding image data to form banding profiles in e) is also in relation to the fundamental frequencies.

3. The method set forth in claim 1, further comprising:

f) determining the fundamental frequency for each banding source in conjunction with processing the banding image data in e); and g) matching banding sources to select marking modules based at least in part on matching the determined fundamental frequencies for the banding sources to the known fundamental frequencies for the select marking modules.

4. The method set forth in claim 3 wherein the banding image data and corresponding banding profile associated with any banding source that is not matched to any select marking module is filtered from further consideration in relation to compensation of banding.

5. The method set forth in claim 3 wherein the banding image data and corresponding banding profile associated with any banding source that is not matched to any select marking module is associated with a default marking module for further consideration in relation to compensation of banding.

6. The method set forth in claim 1 wherein the image receiving member in c) is a target media sheet in a select media size and the banding test pattern is marked over a plurality of target media sheets, wherein the fundamental frequency associated with each banding source and the timing reference are used to arrange the banding image data from the plurality of target media sheets in time relation to construct the banding profiles for the banding sources in conjunction with the processing in e).

7. The method set forth in claim 1, further comprising:

f) determining at least one amplitude value in one or more banding profiles from e) exceed a corresponding amplitude threshold to identify dominant banding profiles and corresponding dominant banding sources; and g) processing each dominant banding profile from f) to form a dominant banding signature for the corresponding dominant banding source, each dominant banding signature reflecting the phase relation of amplitude and frequency banding characteristics over at least one sample period of the corresponding fundamental frequency for the corresponding dominant banding source.

8. The method set forth in claim 7 wherein the signature learning mode is initiated in a) in conjunction with a cycle up stage for processing a marking job, the method further comprising:

h) periodically processing the dominant banding signatures formed in g) in relation to the timing reference established in b) to determine a current banding compensation value for the marking platform in conjunction with processing the marking job, wherein the timing reference established in b) is used to combine the corresponding dominant banding signatures in time relation to determine the current banding compensation value;

i) initiating a correction stage in a normal printing mode for banding compensation of the marking platform in conjunction with processing the marking job;

j) processing each banding compensation value formed in h) to determine one or more current banding correction values for one or more corresponding adjustable marking modules such that drive signals to the one or more adjustable marking modules are adjusted by the corresponding banding correction value in conjunction with processing the marking job; and k) processing the marking job using the one or more current banding correction values determined in j) for the one or more adjustable marking modules.

9. The method set forth in claim 7, further comprising:

h) initiating a cycle up stage in a phase learning mode to determine phase banding characteristics for each dominant banding signature formed in g) in conjunction with processing a marking job;

i) establishing a second timing reference after the plurality of marking modules have achieved a relatively constant velocity in conjunction with the cycle up stage;

j) marking a second banding test pattern on the image receiving member over at least multiple intervals of the lowest fundamental frequency among the select marking modules;

k) obtaining banding image data for the second banding test pattern from the test pattern image sensor in conjunction with the marking in j); and l) processing the banding image data obtained in k) with each dominant banding signature formed in g) in relation to the second timing reference to form a corresponding banding phase estimate for each dominant banding signature formed in g) in conjunction with processing the marking job.

10. The method set forth in claim 9, further comprising:

m) periodically processing each dominant banding signature formed in g) with the corresponding banding phase estimate formed in l) in relation to the second timing reference established in i) to determine a current banding compensation value for the marking platform, wherein the second timing reference established in i) is used to combine the corresponding dominant banding signatures in time relation to determine the current banding compensation value;

n) initiating a correction stage in a normal printing mode for banding compensation of the marking platform in conjunction with processing the marking job;

o) processing each banding compensation value formed in m) to determine one or more current banding correction values for one or more corresponding adjustable marking modules such that drive signals to the one or more adjustable marking modules are adjusted by the corresponding banding correction value in conjunction with processing the marking job; and p) processing the marking job using the one or more current banding correction values determined in o) for the one or more adjustable marking modules.

11. The method set forth in claim 9, further comprising:

m) periodically processing the dominant banding signatures formed in g) with the corresponding banding phase estimates formed in l) in relation to the second timing reference established in i) to determine a current banding compensation value for the marking platform, wherein the second timing reference established in i) is used to combine the dominant banding signatures in time relation to determine the current banding compensation value;

n) correlating the current banding compensation value with the banding image data obtained in k) in relation to the second timing reference established in i) to determine a corresponding current effectiveness metric;

o) determining at least one current effectiveness metric determined in n) exceeds a corresponding effectiveness threshold;

p) repeating a) through e) to re-learn banding signatures for banding sources of the marking platform.

12. A method for compensation of banding in a marking platform, comprising:

a) initiating a cycle up stage in a phase learning mode to determine phase banding characteristics for each of one or more current dominant banding signatures in conjunction with processing a marking job on a marking platform, the marking platform comprising a plurality of marking modules at least a portion of which are select marking modules, each select marking module being a potential banding source such that a fundamental frequency for banding characteristics associated with each select marking module is known, each dominant banding signature reflecting amplitude and frequency banding characteristics over at least one sample period of the corresponding fundamental frequency for corresponding dominant banding sources;

b) establishing a timing reference after the plurality of marking modules have achieved a relatively constant velocity in conjunction with the cycle up stage;

c) marking a banding test pattern on an image receiving member over at least multiple intervals of a lowest fundamental frequency among the select marking modules;

d) obtaining banding image data for the banding test pattern from a test pattern image sensor in conjunction with the marking in c); and e) processing the banding image data obtained in d) with each of the one or more current dominant banding signatures in relation to the timing reference to form a corresponding banding phase estimate for each of the one or more current dominant banding signatures in conjunction with processing the marking job.

13. The method set forth in claim 12, further comprising:

f) periodically processing each of the one or more current dominant banding signatures with the corresponding banding phase estimate formed in e) in relation to the timing reference established in b) to determine a current banding compensation value for the marking platform, wherein the timing reference established in b) is used to combine the corresponding current dominant banding signatures in time relation to determine the current banding compensation value;

g) initiating a correction stage in a normal printing mode for banding compensation of the marking platform in conjunction with processing the marking job;

h) processing each banding compensation value formed in f) to determine one or more current banding correction values for one or more corresponding adjustable marking modules such that drive signals to the one or more adjustable marking modules are adjusted by the corresponding banding correction value in conjunction with processing the marking job; and i) processing the marking job using the one or more current banding correction values determined in h) for the one or more adjustable marking modules.

14. The method set forth in claim 12, further comprising:

f) periodically processing each of the one or more current dominant banding signatures with the corresponding banding phase estimates formed in e) in relation to the timing reference established in b) to determine a current banding compensation value for the marking platform, wherein the timing reference established in b) is used to combine the current dominant banding signatures in time relation to determine the current banding compensation value;

g) correlating the current banding compensation value with the banding image data obtained in d) in relation to the timing reference established in b) to determine a corresponding current effectiveness metric; and h) determining at least one current effectiveness metric determined in g) exceeds a corresponding effectiveness threshold.

15. The method set forth in claim 14, further comprising:

i) initiating a signature learning mode in conjunction with the cycle up stage to determine banding characteristics of the marking platform;

j) establishing a second timing reference after the plurality of marking modules have achieved a relatively constant velocity in conjunction with the signature learning mode;

k) marking a second banding test pattern on the image receiving member over at least multiple intervals of the lowest fundamental frequency among the select marking modules;

l) obtaining banding image data for the second banding test pattern from the test pattern image sensor in conjunction with the marking in k);

m) processing the banding image data in relation to the second timing reference to form banding profiles for one or more banding sources within the marking platform, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the second timing reference for the corresponding banding source in relation to the second banding test pattern;

n) determining at least one amplitude value in one or more banding profiles from m) exceed a corresponding amplitude threshold to identify dominant banding profiles and corresponding dominant banding sources; and o) processing each dominant banding profile from n) to form dominant banding signatures for the corresponding dominant banding sources, each dominant banding signature reflecting the phase relation of amplitude and frequency banding characteristics over at least one sample period of the corresponding fundamental frequency for the corresponding dominant banding source.

16. The method set forth in claim 12, further comprising:

f) prior to the cycle up stage, initiating a signature learning mode to determine banding characteristics of the marking platform;

g) establishing a second timing reference after the plurality of marking modules have achieved a relatively constant velocity in conjunction with the signature learning mode;

h) marking a second banding test pattern on the image receiving member over at least multiple intervals of the lowest fundamental frequency among the select marking modules;

i) obtaining banding image data for the second banding test pattern from the test pattern image sensor in conjunction with the marking in h);

j) processing the banding image data in relation to the second timing reference to form banding profiles for one or more banding sources within the marking platform, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the second timing reference for the corresponding banding source in relation to the second banding test pattern;

k) determining at least one amplitude value in one or more banding profiles from j) exceed a corresponding amplitude threshold to identify dominant banding profiles and corresponding dominant banding sources; and l) processing each dominant banding profile from k) to form dominant banding signatures for the corresponding dominant banding sources, each dominant banding signature reflecting the phase relation of amplitude and frequency banding characteristics over at least one sample period of the corresponding fundamental frequency for the corresponding dominant banding source.

17. A method for compensation of banding in a marking platform, comprising:

a) initiating a banding signature validation mode to test if current dominant banding signatures for a marking platform need to be replaced with fresh dominant banding signatures, the marking platform comprising a plurality of marking modules at least a portion of which are select marking modules, each select marking module being a potential banding source such that a fundamental frequency for banding characteristics associated with each select marking module is known, each current dominant banding signature reflecting amplitude and frequency banding characteristics over at least one sample period of the corresponding fundamental frequency for corresponding dominant banding sources;

b) periodically processing each of one or more current dominant banding signatures with corresponding banding phase estimates in relation to a timing reference to determine a current banding compensation value for the marking platform, each banding phase estimate formed from banding image data associated with a banding test pattern, each banding phase estimate processed using the corresponding current dominant banding signature in relation to the timing reference, the timing reference established after the plurality of marking modules achieve a relatively constant velocity in conjunction with the banding signature validation mode, wherein the timing reference is used to combine the dominant banding signatures in time relation to determine the current banding compensation value;

c) correlating the current banding compensation value with the banding image data in relation to the timing reference to determine a corresponding current effectiveness metric; and d) determining at least one current effectiveness metric determined in c) exceeds a corresponding effectiveness threshold.

18. The method set forth in claim 17, further comprising:

e) initiating a signature learning mode to determine banding characteristics of the marking platform;

f) establishing a second timing reference after the plurality of marking modules have achieved a relatively constant velocity in conjunction with the signature learning mode;

g) marking a second banding test pattern on the image receiving member over at least multiple intervals of the lowest fundamental frequency among the select marking modules;

h) obtaining banding image data for the second banding test pattern from a test pattern image sensor in conjunction with the marking in g);

i) processing the banding image data in relation to the second timing reference to form banding profiles for one or more banding sources within the marking platform, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the second timing reference for the corresponding banding source in relation to the second banding test pattern;

j) determining at least one amplitude value in one or more banding profiles from i) exceed a corresponding amplitude threshold to identify dominant banding profiles and corresponding dominant banding sources; and k) processing each dominant banding profile from j) to form the fresh dominant banding signatures for the corresponding dominant banding sources, each fresh dominant banding signature reflecting the phase relation of amplitude and frequency banding characteristics over at least one sample period of the corresponding fundamental frequency for corresponding dominant banding sources.

19. The method set forth in claim 17, further comprising:

e) prior to the banding signature validation mode, initiating a signature learning mode to determine banding characteristics of the marking platform;

f) establishing a second timing reference after the plurality of marking modules have achieved a relatively constant velocity in conjunction with the signature learning mode;

g) marking a second banding test pattern on the image receiving member over at least multiple intervals of the lowest fundamental frequency among the select marking modules;

h) obtaining banding image data for the second banding test pattern from a test pattern image sensor in conjunction with the marking in g);

i) processing the banding image data in relation to the second timing reference to form banding profiles for one or more banding sources within the marking platform, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the second timing reference for the corresponding banding source in relation to the second banding test pattern;

j) determining at least one amplitude value in one or more banding profiles from i) exceed a corresponding amplitude threshold to identify dominant banding profiles and corresponding dominant banding sources; and k) processing each dominant banding profile from j) to form the dominant banding signatures referred to as current dominant banding signatures in a).

20. The method set forth in claim 17, further comprising:

e) prior to the banding signature validation mode, initiating a cycle up stage in a phase learning mode to determine phase banding characteristics for each of the one or more current dominant banding signatures in conjunction with processing a marking job on the marking platform;

f) establishing the timing reference after the plurality of marking modules have achieved a relatively constant velocity in conjunction with the cycle up stage;

g) marking the banding test pattern on an image receiving member over at least multiple intervals of a lowest fundamental frequency among the select marking modules;

h) obtaining the banding image data for the banding test pattern from a test pattern image sensor in conjunction with the marking in g); and i) processing the banding image data obtained in h) with each of the one or more current dominant banding signatures in relation to the timing reference to form the corresponding banding phase estimate for each of the one or more current dominant banding signatures in conjunction with processing the marking job.

21. A method for compensation of banding in a marking platform, comprising:

a) processing banding image data in relation to a timing reference to form a banding profile for each of one or more banding sources within a marking platform, the marking platform comprising a plurality of marking modules at least a portion of which are select marking modules, each select marking module being a potential banding source such that a fundamental frequency for banding characteristics associated with each select marking module is known, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the timing reference for the corresponding banding source in relation to a banding test pattern;

b) determining at least one amplitude value in one or more banding profiles exceed a corresponding amplitude threshold to identify dominant banding profiles and corresponding dominant banding sources; and c) processing each dominant banding profile to form a dominant banding signature for the corresponding dominant banding source, each dominant banding signature reflecting the phase relation of amplitude and frequency banding characteristics over at least one sample period of the corresponding fundamental frequency for the corresponding dominant banding source.

22. The method set forth in claim 21 wherein the processing in a) is initiated in conjunction with a cycle up stage for processing a marking job, the method further comprising:

d) periodically processing the dominant banding signatures formed in c) in relation to the timing reference to determine a current banding compensation value for the marking platform in conjunction with processing the marking job, wherein the timing reference is used to combine the corresponding dominant banding signatures in time relation to determine the current banding compensation value;

e) initiating a correction stage in a normal printing mode for banding compensation of the marking platform in conjunction with processing the marking job;

f) processing each banding compensation value formed in d) to determine one or more current banding correction values for one or more corresponding adjustable marking modules such that drive signals to the one or more adjustable marking modules are adjusted by the corresponding banding correction value in conjunction with processing the marking job; and g) processing the marking job using the one or more current banding correction values determined in f) for the one or more adjustable marking modules.

23. The method set forth in claim 21, further comprising:

d) initiating a cycle up stage in a phase learning mode to determine phase banding characteristics for each dominant banding signature formed in c) in conjunction with processing a marking job;

e) establishing a second timing reference after the plurality of marking modules have achieved a relatively constant velocity in conjunction with the cycle up stage;

f) marking a second banding test pattern on the image receiving member over at least multiple intervals of the lowest fundamental frequency among the select marking modules;

g) obtaining banding image data for the second banding test pattern from the test pattern image sensor in conjunction with the marking in f); and h) processing the banding image data obtained in g) with each dominant banding signature formed in c) in relation to the second timing reference to form a corresponding banding phase estimate for each dominant banding signature formed in c) in conjunction with processing the marking job.

24. The method set forth in claim 23, further comprising:

i) periodically processing each dominant banding signature formed in c) with the corresponding banding phase estimate formed in h) in relation to the second timing reference established in e) to determine a current banding compensation value for the marking platform, wherein the second timing reference established in e) is used to combine the corresponding dominant banding signatures in time relation to determine the current banding compensation value;

j) initiating a correction stage in a normal printing mode for banding compensation of the marking platform in conjunction with processing the marking job;

k) processing each banding compensation value formed in i) to determine one or more current banding correction values for one or more corresponding adjustable marking modules such that drive signals to the one or more adjustable marking modules are adjusted by the corresponding banding correction value in conjunction with processing the marking job; and l) processing the marking job using the one or more current banding correction values determined in k) for the one or more adjustable marking modules.

25. The method set forth in claim 23, further comprising:

i) periodically processing the dominant banding signatures formed in c) with the corresponding banding phase estimates formed in h) in relation to the second timing reference established in e) to determine a current banding compensation value for the marking platform, wherein the second timing reference established in e) is used to combine the dominant banding signatures in time relation to determine the current banding compensation value;

j) correlating the current banding compensation value with the banding image data obtained in g) in relation to the second timing reference established in e) to determine a corresponding current effectiveness metric; and k) determining at least one current effectiveness metric determined in j) exceeds a corresponding effectiveness threshold.

26. An apparatus for compensation of banding in a marking platform, comprising:

means for initiating a signature learning mode to determine banding characteristics of a marking platform, the marking platform comprising a plurality of marking modules at least a portion of which are select marking modules, each select marking module being a potential banding source such that a fundamental frequency for banding characteristics associated with each select marking module is known;

means for establishing a timing reference after the plurality of marking modules have achieved a relatively constant velocity in conjunction with the signature learning mode;

means for marking a banding test pattern on an image receiving member over at least multiple intervals of a lowest fundamental frequency among the select marking modules;

means for obtaining banding image data for the banding test pattern from a test pattern image sensor in conjunction with the marking of the banding test pattern;

means for processing the banding image data in relation to the timing reference to form a banding profile for each of one or more banding sources within the marking platform, wherein the fundamental frequency for each banding source is used to determine banding characteristics attributed to the corresponding banding source and filter banding characteristics not attributed to the corresponding banding source for the corresponding banding profile, each banding profile reflecting a phase relation of amplitude and frequency banding characteristics to the timing reference for the corresponding banding source;

means for determining at least one amplitude value in one or more banding profiles exceed a corresponding amplitude threshold to identify dominant banding profiles and corresponding dominant banding sources; and means for processing each dominant banding profile to form a dominant banding signature for the corresponding dominant banding source, each dominant banding signature reflecting the phase relation of amplitude and frequency banding characteristics over at least one sample period of the corresponding fundamental frequency for the corresponding dominant banding source.

27. The apparatus set forth in claim 26, wherein the apparatus is configured to operate in conjunction with a cycle up stage for processing a marking job, the apparatus further comprising:

means for periodically processing the dominant banding signatures in relation to the timing reference to determine a current banding compensation value for the marking platform in conjunction with processing the marking job, wherein the timing reference is used to combine the corresponding dominant banding signatures in time relation to determine the current banding compensation value;

means for initiating a correction stage in a normal printing mode for banding compensation of the marking platform in conjunction with processing the marking job;

means for processing each banding compensation value to determine one or more current banding correction values for one or more corresponding adjustable marking modules such that drive signals to the one or more adjustable marking modules are adjusted by the corresponding banding correction value in conjunction with processing the marking job; and means for processing the marking job using the one or more current banding correction values for the one or more adjustable marking modules.

28. The apparatus set forth in claim 26, further comprising:

means for initiating a cycle up stage in a phase learning mode to determine phase banding characteristics for each dominant banding signature in conjunction with processing a marking job;

means for establishing a second timing reference after the plurality of marking modules have achieved a relatively constant velocity in conjunction with the cycle up stage;

means for marking a second banding test pattern on the image receiving member over at least multiple intervals of the lowest fundamental frequency among the select marking modules;

means for obtaining banding image data for the second banding test pattern from the test pattern image sensor in conjunction with the marking of the second banding test pattern; and means for processing the banding image data obtained in from the second banding test pattern with each dominant banding signature in relation to the second timing reference to form a corresponding banding phase estimate for each dominant banding signature in conjunction with processing the marking job.

29. The apparatus set forth in claim 28, further comprising:

means for periodically processing each dominant banding signature with the corresponding banding phase estimate in relation to the second timing reference to determine a current banding compensation value for the marking platform, wherein the second timing reference is used to combine the corresponding dominant banding signatures in time relation to determine the current banding compensation value;

means for initiating a correction stage in a normal printing mode for banding compensation of the marking platform in conjunction with processing the marking job;

means for processing each banding compensation value to determine one or more current banding correction values for one or more corresponding adjustable marking modules such that drive signals to the one or more adjustable marking modules are adjusted by the corresponding banding correction value in conjunction with processing the marking job; and means for processing the marking job using the one or more current banding correction values for the one or more adjustable marking modules.

30. The apparatus set forth in claim 28, further comprising:

means for initiating a banding signature validation mode to test if current dominant banding signatures for the marking platform need to be replaced with fresh dominant banding signatures, each current dominant banding signature reflecting amplitude and frequency banding characteristics over at least one sample period of the corresponding fundamental frequency for corresponding dominant banding sources;

means for periodically processing each of one or more current dominant banding signatures with corresponding banding phase estimates in relation to a third timing reference to determine a current banding compensation value for the marking platform, the third timing reference established after the plurality of marking modules achieve a relatively constant velocity in conjunction with the banding signature validation mode, wherein the third timing reference is used to combine the dominant banding signatures in time relation to determine the current banding compensation value;

means for correlating the current banding compensation value with the banding image data in relation to the third timing reference to determine a corresponding current effectiveness metric; and means for determining at least one current effectiveness metric exceeds a corresponding effectiveness threshold.

* * * * *